United States Patent
Noda et al.

(10) Patent No.: US 9,213,497 B2
(45) Date of Patent: Dec. 15, 2015

(54) STORAGE APPARATUS AND STORAGE APPARATUS MIGRATION METHOD

(71) Applicant: Hitachi, Ltd., Tokyo (JP)

(72) Inventors: Takashi Noda, Tokyo (JP); Shigeo Homma, Tokyo (JP); Tomohiro Kawaguchi, Tokyo (JP); Hideo Saito, Tokyo (JP); Kazuhide Sano, Tokyo (JP); Shuji Kondo, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 14/426,185

(22) PCT Filed: Dec. 13, 2012

(86) PCT No.: PCT/JP2012/082361
§ 371 (c)(1),
(2) Date: Mar. 5, 2015

(87) PCT Pub. No.: WO2014/091600
PCT Pub. Date: Jun. 19, 2014

(65) Prior Publication Data
US 2015/0227322 A1    Aug. 13, 2015

(51) Int. Cl.
*G06F 3/06* (2006.01)
*G06F 11/20* (2006.01)
*G06F 11/00* (2006.01)
*G06F 17/30* (2006.01)

(52) U.S. Cl.
CPC .............. *G06F 3/0647* (2013.01); *G06F 3/065* (2013.01); *G06F 3/067* (2013.01); *G06F 3/0608* (2013.01); *G06F 3/0664* (2013.01); *G06F 11/00* (2013.01); *G06F 11/2074* (2013.01); *G06F 11/2082* (2013.01); *G06F 11/2089* (2013.01); *G06F 17/30191* (2013.01); *G06F 2201/855* (2013.01)

(58) Field of Classification Search
None
See application file for complete search history.

(56) References Cited

U.S. PATENT DOCUMENTS

| | | | | |
|---|---|---|---|---|
| 6,240,494 B1 * | 5/2001 | Nagasawa | ............. | G06F 3/0607 711/112 |
| 6,640,291 B2 * | 10/2003 | Fujibayashi | .......... | G06F 3/0607 711/161 |
| 7,080,202 B2 * | 7/2006 | Kasako | ................. | G06F 3/0607 711/114 |

(Continued)

FOREIGN PATENT DOCUMENTS

| JP | 2005-182222 A | 7/2005 |
|---|---|---|
| JP | 2008-165624 A | 7/2008 |
| JP | 2009-146106 A | 7/2009 |

*Primary Examiner* — Steven Snyder
(74) *Attorney, Agent, or Firm* — Mattingly & Malur, PC

(57) ABSTRACT

A migration-destination primary storage apparatus (MD-PDKC) comprises a second PVOL and a second journal storage area storing a journal corresponding to write data for the second PVOL, and executes a data copy to the second PVOL from a first PVOL, which is in a migration-source primary storage apparatus (MS-PDKC) and forms a copy pair with an SVOL in a secondary storage apparatus (SDKC). After the data copy has been completed, the MD-PDKC acquires the latest write sequence information from the MS-PDKC, and upon receiving a write request for the second PVOL, writes the write-request write data to the second PVOL, creates a journal by using journal data corresponding to the write data and also by using update information showing write sequence information based on the acquired latest write sequence information, and writes the journal to the second journal storage area.

4 Claims, 32 Drawing Sheets

(56) References Cited

U.S. PATENT DOCUMENTS

| | | | | |
|---|---|---|---|---|
| 7,117,327 B2* | 10/2006 | Hirakawa | G06F 11/2058 | 707/999.202 |
| 7,165,163 B2* | 1/2007 | Kasako | G06F 11/2069 | 711/112 |
| 7,200,727 B2* | 4/2007 | Kasako | G06F 3/0607 | 711/154 |
| 7,203,806 B2* | 4/2007 | Kasako | G06F 3/0607 | 711/112 |
| 7,219,201 B2* | 5/2007 | Kasako | G06F 11/2069 | 711/112 |
| 7,240,173 B2* | 7/2007 | Hirakawa | G06F 11/2058 | 707/999.202 |
| 7,363,461 B2* | 4/2008 | Kasako | G06F 11/2069 | 711/112 |
| 7,415,589 B2* | 8/2008 | Hirakawa | G06F 11/2058 | 707/999.202 |
| 7,430,648 B2* | 9/2008 | Kasako | G06F 3/0607 | 711/112 |
| 7,464,236 B2* | 12/2008 | Sano | G06F 11/2058 | 707/999.202 |
| 7,472,173 B2* | 12/2008 | Maruyama | G06F 11/2064 | 709/202 |
| 7,660,957 B2* | 2/2010 | Hirakawa | G06F 11/2058 | 707/644 |
| 7,707,377 B2* | 4/2010 | Kasako | G06F 11/2069 | 711/162 |
| 7,975,116 B2* | 7/2011 | Kasako | G06F 11/2069 | 711/162 |
| 8,255,652 B2* | 8/2012 | Kasako | G06F 11/2069 | 711/162 |
| 8,291,101 B1* | 10/2012 | Yan | H04L 67/1095 | 709/230 |
| 8,375,004 B2* | 2/2013 | Kondo | G06F 11/1456 | 707/648 |
| 8,510,515 B2* | 8/2013 | Yamamoto | G06F 3/0608 | 711/147 |
| 8,904,133 B1* | 12/2014 | Kono | G06F 3/0647 | 711/162 |
| 8,935,496 B2* | 1/2015 | Deguchi | G06F 9/5027 | 711/162 |
| 9,052,839 B2* | 6/2015 | Saito | G06F 3/0619 | 1/1 |
| 2002/0004857 A1* | 1/2002 | Arakawa | G06F 3/0605 | 710/1 |
| 2003/0177321 A1* | 9/2003 | Watanabe | G06F 11/2058 | 711/161 |
| 2004/0148443 A1* | 7/2004 | Achiwa | G06F 11/2058 | 710/36 |
| 2004/0153719 A1* | 8/2004 | Achiwa | G06F 11/2041 | 714/6.32 |
| 2005/0050115 A1* | 3/2005 | Kekre | G06F 11/2058 | 1/1 |
| 2005/0138308 A1 | 6/2005 | Morishita et al. | | |
| 2006/0277378 A1* | 12/2006 | Morishita | G06F 3/061 | 711/162 |
| 2008/0086608 A1* | 4/2008 | Kano | G06F 3/0607 | 711/162 |
| 2008/0301386 A1* | 12/2008 | Matsui | G06F 11/2064 | 711/162 |
| 2009/0157846 A1 | 6/2009 | Shimozono et al. | | |
| 2011/0258406 A1* | 10/2011 | Suetsugu | G06F 3/0608 | 711/162 |
| 2013/0132693 A1* | 5/2013 | Kondo | G06F 11/1456 | 711/162 |
| 2014/0317366 A1* | 10/2014 | Sakata | G06F 3/065 | 711/162 |
| 2015/0074364 A1* | 3/2015 | Kono | G06F 3/0647 | 711/162 |
| 2015/0121005 A1* | 4/2015 | Deguchi | G06F 9/5027 | 711/114 |

* cited by examiner

STORAGE APPARATUS AND STORAGE APPARATUS MIGRATION METHOD

TECHNICAL FIELD

The present invention relates to a technology for migrating a volume of either a primary storage apparatus or a secondary storage apparatus to a different storage apparatus in a remote copy system comprising primary storage apparatus and secondary storage apparatus.

BACKGROUND ART

The following terminology will be used in the specification.

(*) "PDEV" is the abbreviation for a physical storage device (typically a nonvolatile storage device). The PDEV, for example, comprises a storage medium (typically a nonvolatile storage medium) and a controller for controlling an input/output (I/O) of data thereto. A nonvolatile storage medium may be a hard disk group (one or more hard disks) or an NVM group (one or more nonvolatile semiconductor memories (NVM)). That is, the PDEV, for example, may be a hard disk drive (HDD) or an NVM device such as a flash memory (FM) device (for example, a solid state device (SSD)). The NVM, for example, may be an FM or a phase-change memory. The FM, for example, may comprise multiple blocks (physical blocks), and each block may comprise multiple pages (physical pages). The NVM (typically an FM) may be a type of NVM (for example, a NAND-type FM) in which data is written in page units, data cannot be written to the page until the data in the page has been erased, and the data is erased in block units.

(*) "VOL" is the abbreviation for a logical volume, and is a logical storage device. The VOL may be a real VOL (RVOL) or a virtual VOL (VVOL). Furthermore, the VOL may be an online VOL, which is provided to an external apparatus (for example, a host computer) coupled to a DKC comprising this VOL, or an offline VOL, which is not provided to an external apparatus (is not recognized by the external apparatus). The "RVOL" is a VOL, which is based on a physical storage resource (for example, a RAID (a Redundant Array of Independent (or Inexpensive) Disks) group, which comprises multiple PDEV (nonvolatile physical storage devices)) of the storage apparatus that comprises this RVOL. As the "VVOL", for example, there may be an externally coupled VOL (EVOL), which is a storage virtualization technology-compliant VOL that is based on a storage resource (for example, a logical volume) of an external storage apparatus coupled to the storage apparatus comprising this VVOL, or a capacity virtualization technology (typically Thin Provisioning)-compliant VOL (TPVOL), which comprises multiple virtual pages (virtual storage areas). The TPVOL is typically an online VOL. A real page is allocated to the TPVOL from a pool. The "pool" is a storage resource, which comprises multiple real pages (substantial storage areas). The pool, for example, comprises multiple pool VOLs, and each pool VOL is partitioned into two or more real pages. The "pool VOL" is a VOL, which is a component of the pool. The pool VOL may be a RVOL or an EVOL. The pool VOL is typically an offline VOL.

(*) "PVOL" is the abbreviation for a primary logical volume, and is a term denoting a copy-source VOL. "SVOL" is the abbreviation for a secondary logical volume, and is a term denoting a copy-destination VOL. A pair comprising a PVOL and an SVOL is typically a VOL pair. Data is copied from the PVOL to the SVOL.

(*) "DKC" is a term denoting a storage apparatus. The DKC comprises a VOL, and a controller for controlling a data I/O with respect to the VOL. The DKC may comprise either one or multiple PDEVs (for example, either one or multiple RAID groups), and the VOL of the DKC may be a RVOL or a VVOL.

(*) "PDKC" is the abbreviation for a primary DKC, and is a DKC that comprises a PVOL. "SDKC" is the abbreviation for a secondary DKC, and is the abbreviation of a DKC that comprises an SVOL. A remote computer system, typically, comprises a PDKC and a SDKC, and a PVOL and an SVOL that comprise a VOL pair exist in different DKCs.

(*) "MS" is the abbreviation for migration source. For example, "MS-PDKC" signifies the migration-source PDKC.

(*) "MD" is the abbreviation for migration destination. For example, "MD-PDKC" signifies the migration-destination PDKC.

A remote copy system that has a PDKC and an SDKC, and copies from the PVOL of the PDKC to the SVOL of the SDKC is known. A remote copy may include a synchronous remote copy for synchronizing the writing of data to the PVOL with the writing of this data to the SVOL, and an asynchronous remote copy for not synchronizing the writing of data to the PVOL with the writing of this data to the SVOL.

For example, Patent Literature 1 discloses a technology related to the asynchronous remote copy, that is, a technology for migrating a PVOL to a difference DKC.

CITATION LIST

Patent Literature

[PTL 1]
Japanese Patent Application Publication No. 2005-182222

SUMMARY OF INVENTION

Technical Problem

In the technology according to Patent Literature 1, it is necessary to install a virtual management network in the remote copy system, and to provide a function for the MS-DKC to migrate a PVOL.

The situation for migrating the PVOL here can be considered one wherein the remote copy system migrates the PVOL using a currently operating old model DKC, which manages a PVOL in an asynchronous remote copy, as the MS (migration source), and using a new model DKC, which has been newly installed, as the MD (migration destination). In a situation such as this, the technology according to Patent Literature 1 must provide a function for the MS-DKC to migrate the PVOL, but the MS-DKC does not necessarily come with such a function, making it necessary to go to the trouble of providing this function to the MS-DKC. To begin with, there are cases in which it is not possible to provide the MS-DKC with the required function.

Furthermore, in a case where asynchronous remote copying is ongoing, journals corresponding to PVOL updates are created in the MS-PDKC and the MD-PDKC, and the journals are managed by sequence numbers, but when the creation of the MS-DKC journal and the journal of the migration-destination storage apparatus are not properly handled, it is impossible to create a consistent SVOL based on these journals.

Solution to Problem

A migration-destination primary storage apparatus (MD-PDKC) is coupled to a migration-source primary storage apparatus (MS-PDKC). The MS-PDKC comprises a first PVOL that forms a copy pair with an SVOL in the SDKC, and a first journal storage area for storing a journal corresponding to write data of the first PVOL, and is configured to transfer a journal to the SDKC. The MD-PDKC comprises a second PVOL, and a second journal storage area for storing a journal corresponding to write data of the second PVOL, and is configured to execute a data copy from the first PVOL to the second PVOL. The MD-PDKC, after completing a copy, acquires the latest write sequence information from the MS-PDKC, and upon receiving a write request with respect to the second PVOL, writes the write-request write data to the second PVOL, creates a journal using journal data corresponding to the write data and update information showing write sequence information based on the acquired latest write sequence information, and writes the journal to the second journal storage area. The journal storage area may be a type of VOL, or may be a storage area in a memory in the DKC (for example, a cache memory). The memory may a memory in the controller inside the DKC.

Advantageous Effects of Invention

According to the present invention, it is possible to migrate an MS-PDKC to a MD-PDKC while an asynchronous remote copy is ongoing without adding a special function to the MS-PDKC.

DESCRIPTION OF EMBODIMENTS

A number of examples will be explained below.

In the following explanation, various information may be explained using the expression "aaa table", but the various information may also be expressed using a data structure other than a table. To show that the various information is not dependent on the data structure, "aaa table" may be called "aaa information". Furthermore, a case where processing is explained using a program or software as the doer of the action can actually be understood as one in which a processor or the like is executing the program or the software.

Example 1

Figure 1:
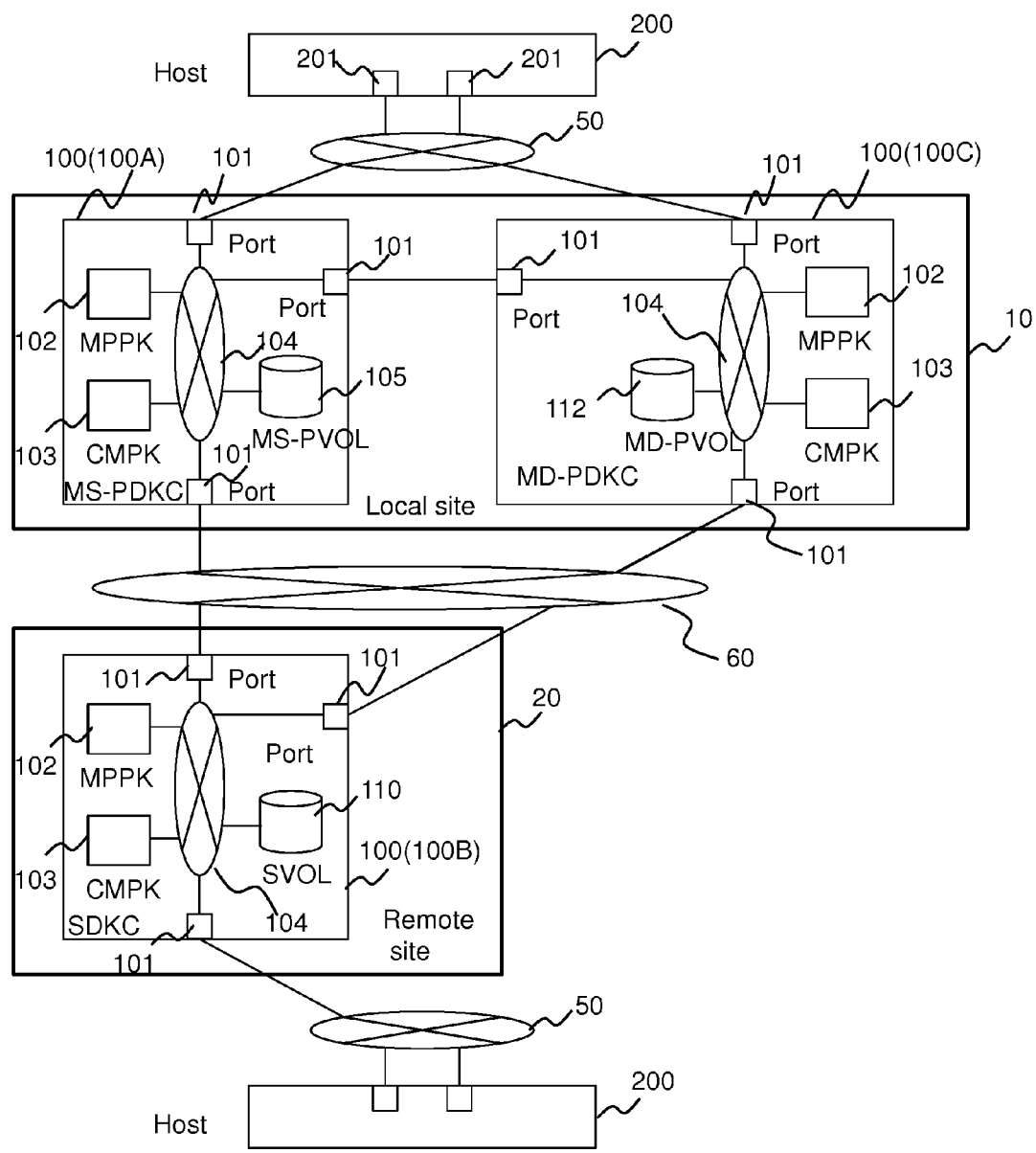
FIG. 1 is a drawing showing an example of the configuration of a computer system related to Example 1.

FIG. 1 is a drawing showing an example of the configuration of a computer system related to Example 1.

The computer system comprises one or more hosts (host computers) 200, and a remote computer system. The remote computer system comprises multiple DKCs (storage apparatuses) 100.

The host 200 is an ordinary computer, comprising a processor, a cache, and a storage apparatus. The host 200 issues the DKC 100 an access command (a read command (read request) or a write command (write request)) specifying an ID (for example, a LUN) of a VOL (for example, a PVOL 105) provided by the DKC 100. The access command, for example, is a SCSI command. The host 200 also comprises one or more ports 201. The port 201 is an example of a communication interface device, and is an interface for coupling to a network 50. Identification information (for example, a world wide name (WWN) or the like) that makes it possible to uniquely identify a port 201 is configured in the port 201. The host 200 stores path management information. The path management information is information, about a path to a DKC 100, in which identification information (for example, a device number) of an access-target VOL has been associated with identification information (port information) of a port 101 in a DKC 100 to be accessed when accessing the VOL.

A MS-PDKC 100A and a SDKC 100B are coupled via a communication network 60. The MS-PDKC 100A and a MD-PDKC 100C, for example, are installed at the same local site 10, and are communicably coupled to one another. However, the MD-PDKC 100C may also be installed at a site that is separate from the MS-PDKC 100A. The SDKC 100B is installed at a remote site 20, which is a place separate from the local site 10. The MD-PDKC 100C and the SDKC 100B are coupled via the communication network 60.

The DKC 100 (100A through 100C), for example, comprises multiple ports 101, one or more microprocessor packages (MPPKs) 102, one or more cache memory packages (CMPKs) 103, an internal network 104, and a PDEV configuring one or more VOLs. The port 101, MPPK 102, CMPK 103, and VOL-configuring PDEV are communicably coupled via the internal network 104. A group of an MPPK and a CMPK is called a storage controller.

For example, as a VOL managed by a DKC 100, the MS-PDKC 100A manages a PVOL 105. The SDKC 100B manages a SVOL 110. The MD-PDKC 100C manages a MD-PVOL 112.

The port 101 is an example of a communication interface device, and is an interface for connecting to a network. Identification information (for example, a world wide name (WWN) or the like) that makes it possible to uniquely identify a port is configured in the port 101. Arbitrary identification information (virtual identification information) can be virtually allocated to the port 101, and this virtual identification information can be used in communications.

In this example, for example, the MS-PDKC 100A comprises a port 101 for coupling to the host 200, a port 101 for coupling to the MD-PDKC 100C, and a port 101 for coupling to the SDKC 100B.

The MD-PDKC comprises a port 101 for coupling to the host 200, a port 101 for coupling to the MS-PDKC 100A, and a port 101 for coupling to the SDKC 100B.

The SDKC 100B comprises a port 101 for coupling to the host 200, a port 101 for coupling to the MS-PDKC 100A, and a port 101 for coupling to the MD-PDKC 100C.

The MPPK 102 is a control device comprising either one or multiple processors. The processor executes various processes in accordance with a program. The MPPK 102 may comprise a memory for storing a program executed by the processor, and data to be used. In this example, the MPPK 102 of the MD-PDKC 100C comprises a program for realizing a new function in this example, which will be explained further below. The MPPK 102 in the MS-PDKC 100A and the SDKC 100B may comprise existing programs.

The CMPK 103 includes one or more cache memories. The one or more cache memories are a volatile memory and/or a nonvolatile memory. The one or more cache memories may comprise, in addition to a storage area (hereinafter, cache area) for temporarily storing data input/output to/from the PDEV, a storage area (hereinafter, shared area) for storing information that is used by the MPPK 102 processor.

Figure 2:
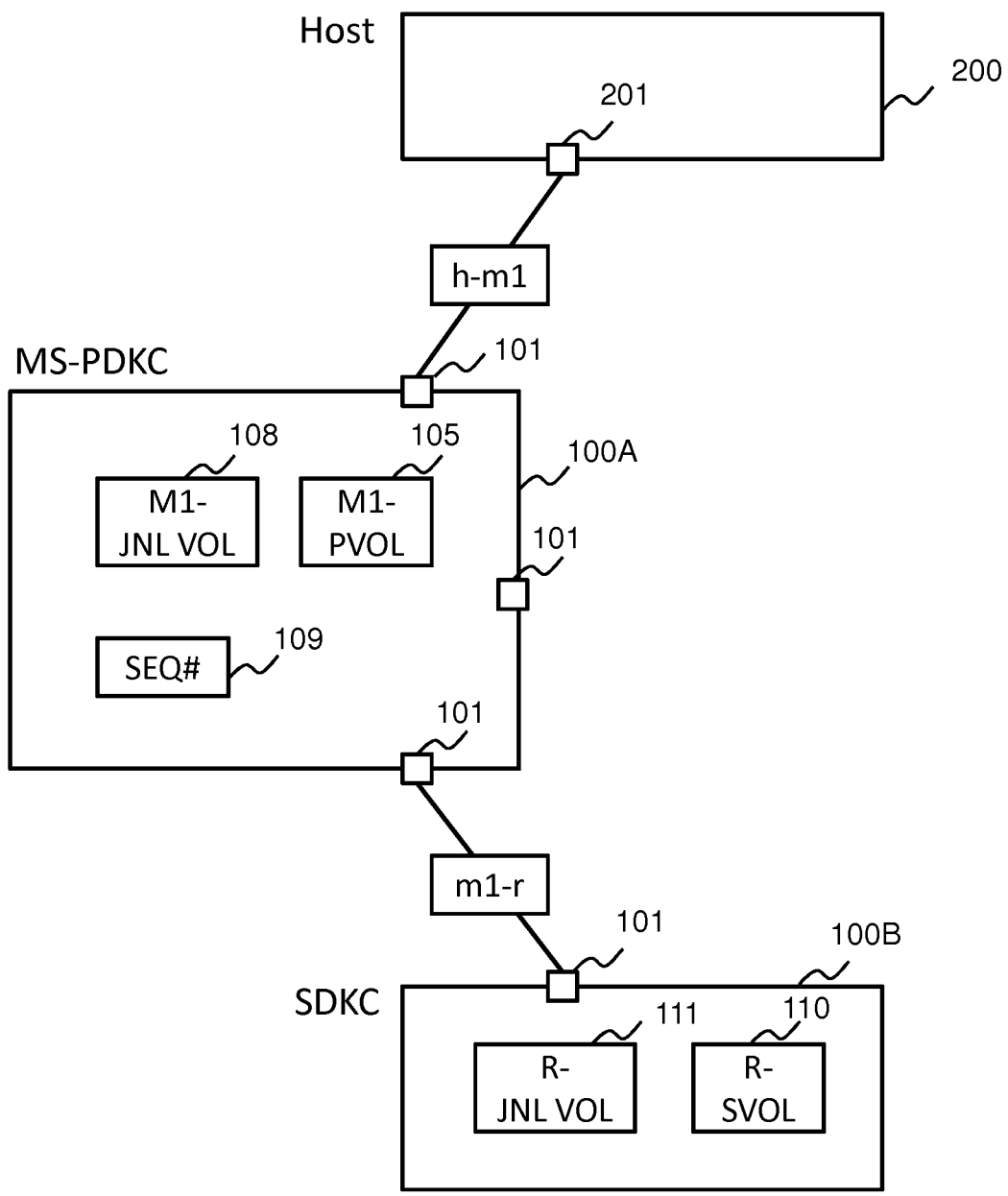
FIG. 2 is a drawing showing an example of the configuration of the computer system in an initial state prior to the start of a migration.

FIG. 2 is a drawing showing an example of the configuration of the computer system in an initial state prior to starting a migration.

The computer system, in the initial state, comprises a host 200, a MS-PDKC 100A, and a SDKC 100B.

The MS-PDKC 100A comprises a MS-PVOL 105, a primary journal VOL (PJVOL) 108 for storing a journal (JNL) showing update content for the MS-PVOL 105, and sequence information (one example of sequence information, also referred to as write sequence information) 109 for storing the latest sequence number (SEQ #) allocated to the journal. The storage area in which the journal is stored is a single VOL in this example, but may be a storage area provided in a different storage device such as the CMPK 103. The sequence number is information showing the write sequence for a primary volume.

The SDKC 100B comprises a SVOL 110 that configures a pair with the MS-PVOL 105, and a secondary JVOL (SJVOL) 111 for storing a journal acquired from the MS-PDKC 100A.

A path h-m1 is formed between the host 200 and the MS-PDKC 100A. For example, an SCSI command such as either a read command or a write command is sent from the host 200 to the MS-PDKC 100A via the path h-m1.

A path m1-r is formed between the MS-PDKC 100A and the SVOL 100B. For example, a command (asynchronous remote copy command) is sent from the SDKC 100B to the MS-PDKC 100A via the path m1-r. As a command that is sent, for example, there is a command (read journal command (RDJNL)) for reading a journal (update information including journal data and a sequential number) of the PJVOL 108 in the MS-PDKC 100A.

Next, the MD-PDKC connections configuration processing in preparation for migrating a PVOL will be explained.

Figure 3:
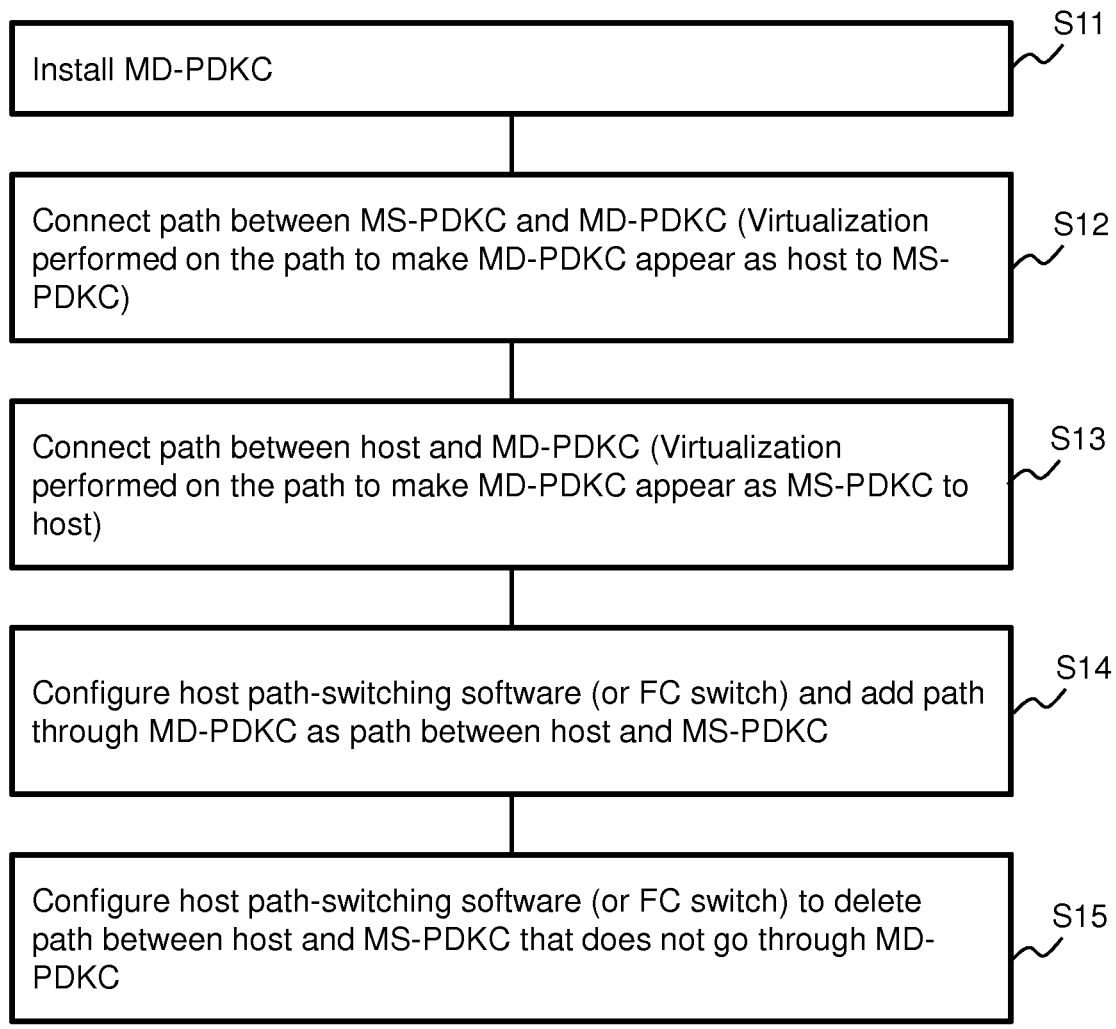
FIG. 3 is a flowchart of MD-PDKC connection configuration processing.
Figure 4:
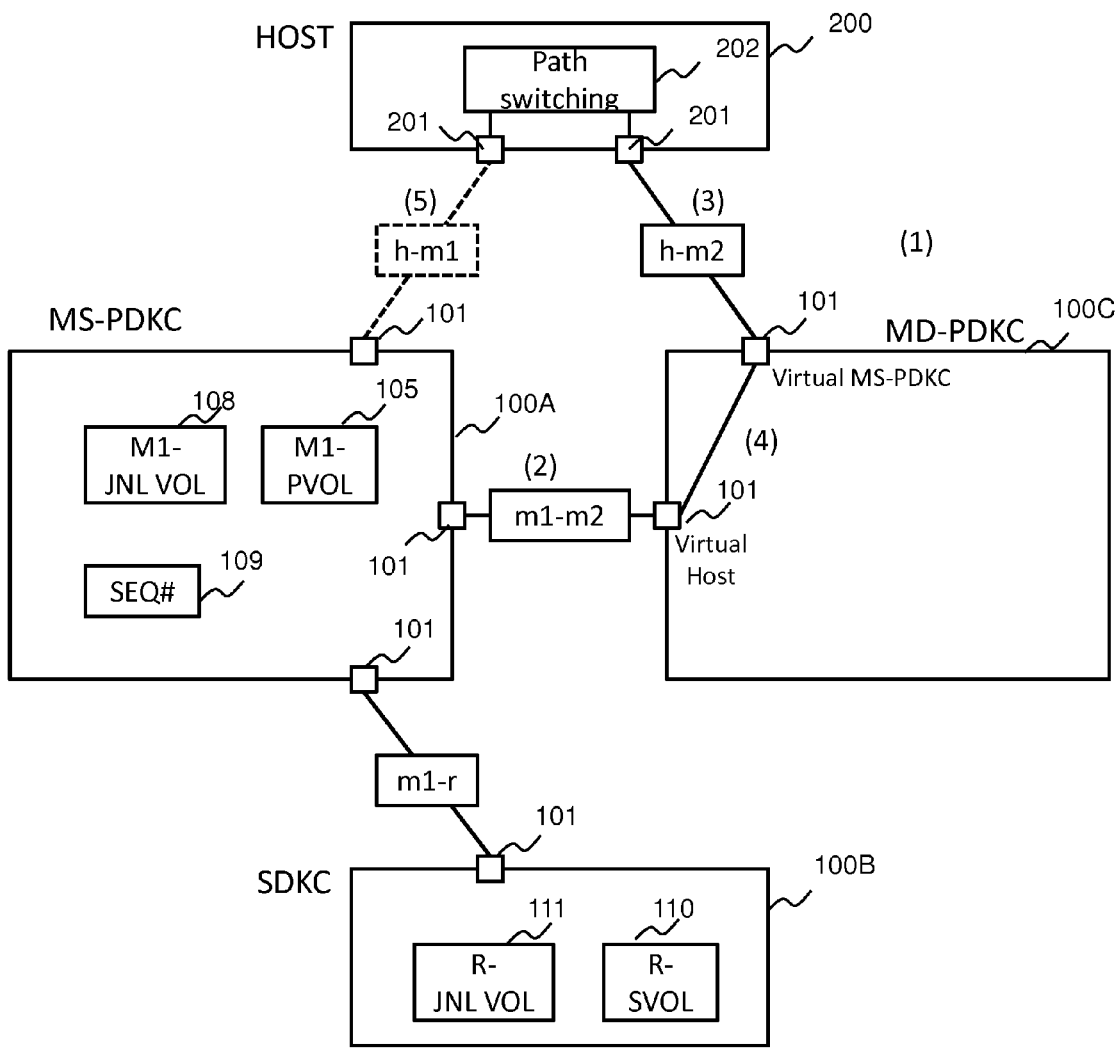
FIG. 4 is a drawing illustrating the MD-PDKC connection configuration processing.

FIG. 3 is a flowchart of MD-PDKC connection configuration processing. FIG. 4 is a drawing illustrating the MD-PDKC connection configuration processing.

First, the administrator installs the MD-PDKC 100C for storing the MD-PVOL 112, for example, at the local site 10 (Step S11, FIG. 4 (1)). At this point in time, the MD-PDKC 100C is physically coupled to the networks 50 and 60, and is also physically coupled to the MS-PDKC 100A.

Next, the administrator connects a path m1-m2 between the MS-PDKC 100A and the MD-PDKC 100C (Step 12, FIG. 4 (2)). As the method for connecting the path here, there is a method in which the administrator makes the configurations using a terminal of a service processor (SVP) coupled to the MD-PDKC 100C and/or a not-shown management apparatus or the like coupled via a network. There may be cases where the operations and configurations performed by the administrator using the SVP or other such terminal is explained giving the "administrator" as the doer of the action without specifying the terminal or the like, but the actual doer of the action may be interpreted as the management apparatus. In this example, virtualization is performed on this path so that the MD-PDKC 100C appears as the host 200 to the MS-PDKC 100A. Specifically, the identification information (port information) of the port 101 in the MD-PDKC 100C that configures this path is virtualized to the same identification information as the identification information of the port 201 (port 201 connected to the path h-m2) in the host 200. In accordance with this, the MS-PDKC 100A perceives communications carried out using this path as being with the host 200, and does not need to be aware of the MD-PDKC 100C.

Next, the administrator connects a path h-m2 between the host 200 and the MD-PDKC 100C (Step S13, FIG. 4 (3)). In this example, virtualization is performed on this path at this time so that the MD-PDKC 100C appears as the MS-PDKC 100A to the host 200. Specifically, the identification information (port information) of the port 101 in the MD-PDKC 100C that configures this path is virtualized to the same identification information as the identification information of the port 101 (port 101 connected to the path m1-m2) in the MS-PDKC 100A. In accordance with this, the host 200 perceives communications carried out using this path as being with the MS-PDKC 100A, and does not need to be aware of the MD-PDKC 100C.

Next, path-switching software 202 in the host 200 (or, an FC switch that exists between the host 200 and the DKC) adds a path (path h-m2) that goes through the MD-PDKC 100C as the path between the host 200 and the MS-PDKC 100A (Step S14). Thereafter, the MD-PDKC 100C (specifically, the MPPK 102 processor in the MD-PDKC 100C), upon acquiring a SCSI command from the host 200 for the MS-PDKC 100A via the path h-m2, transfers this SCSI command to the MS-PDKC 100A via the path m1-m2 (FIG. 4 (4)).

Next, path-switching software 202 in the host 200 (or, an FC switch that exists between the host 200 and the DKC) deletes the path (path h-m1) between the host 200 and the MS-PDKC 100A that does not go through the MD-PDKC 100C (Step S15, FIG. 4 (5)). Before deleting the path (path h-m1) that does not go through the MD-PDKC 100C, a check may be performed to make sure the command transfer via the path that goes through the MD-PDKC 100C is operating normally. In accordance with this, an SCSI command for the PVOL 105 transferred from the host 200 to the MS-PDKC 100A always goes through the MD-PDKC 100C. Therefore, an SCSI command for the PVOL 105 can reliably be discerned in the MD-PDKC 100C.

After the MD-PDKC connection configuration processing has ended, it is possible to start PVOL migration processing for migrating the PVOL 105 of the MS-PDKC 100A to the MD-PDKC 100C.

Next, the PVOL migration processing will be explained.

Figure 5:
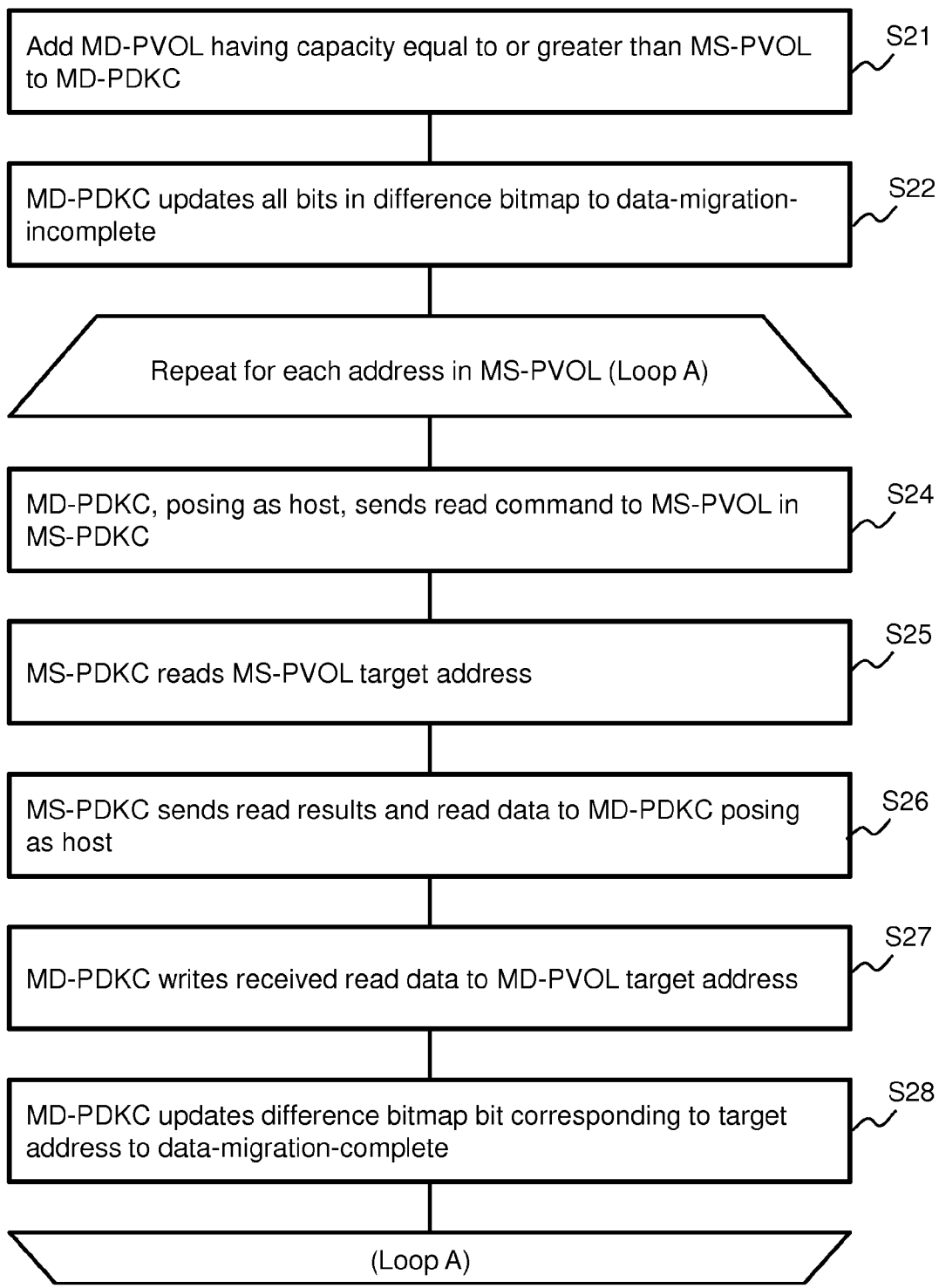
FIG. 5 is a flowchart of PVOL migration processing.
Figure 6:
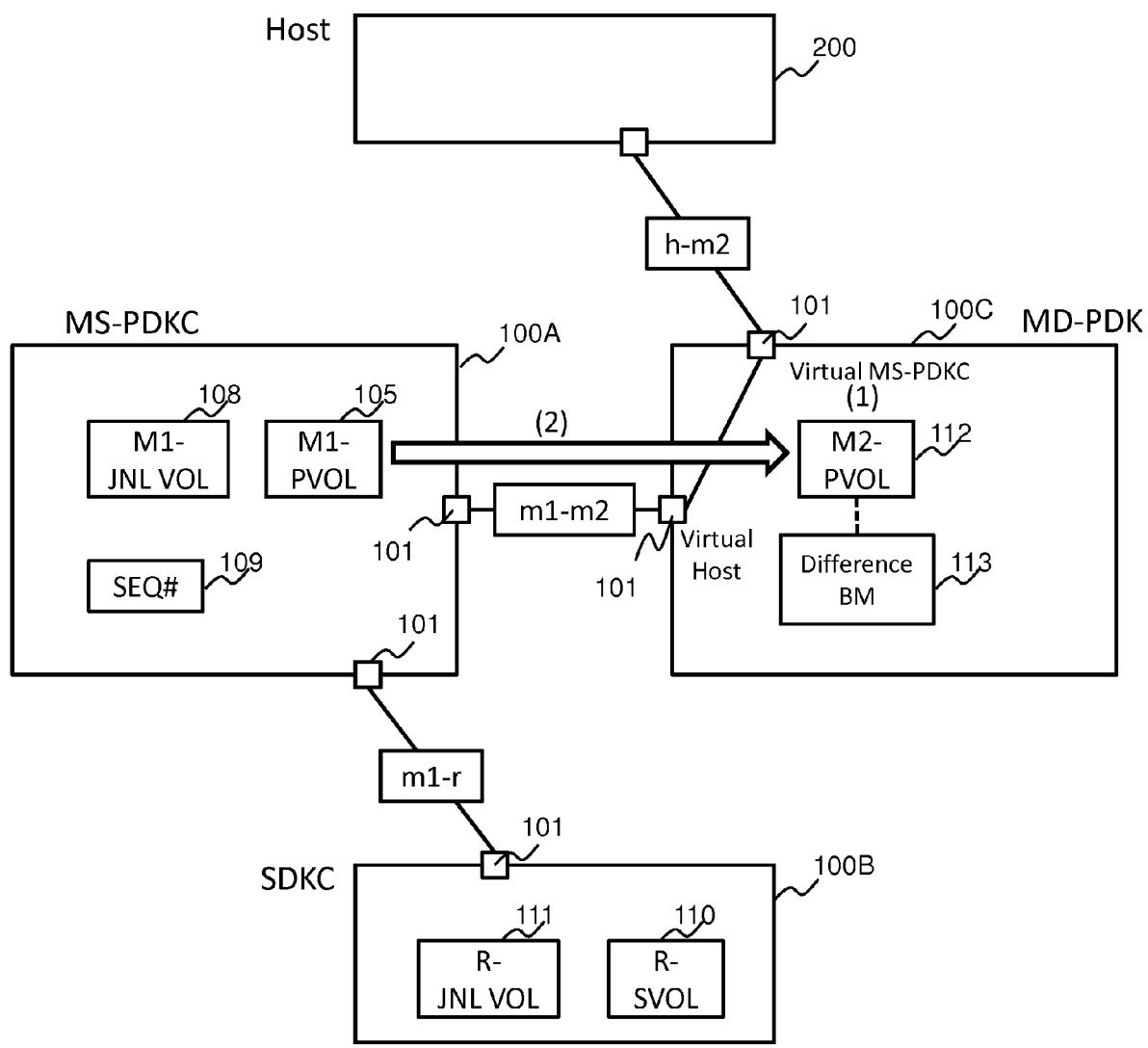
FIG. 6 is a drawing illustrating the PVOL migration processing.

FIG. 5 is a flowchart of the PVOL migration processing. FIG. 6 is a drawing illustrating the PVOL migration processing.

The MD-PDKC 100C prepares, on the PDEV, a VOL (MD-PVOL 112) having a capacity of equal to or greater than the PVOL to be used as the migration destination for the MS-PVOL 105 (Step S21, FIG. 6 (1)). At this point, the MD-PDKC 100C manages a difference bitmap 113 for managing the migration status of the PVOL 105 data in the MD-PVOL 112. The difference bitmap 113 includes bits corresponding to multiple areas (for example, blocks) of the MD-PVOL 112, and, in accordance with the values of these bits, shows whether or not the PVOL 105 data is being migrated (copied) to these areas. Furthermore, for example, in a case where the migration is to be performed sequentially to the MD-PVOL 112 beginning with the data in the area at the start of the PVOL 105, management may be performed to determine the area down to which migration has been completed without the need to manage the difference bitmap 113.

Next, the MD-PDKC 100C updates the values of all the bits in the difference bitmap 113 to values showing that the data migration is not complete (Step S22).

Then, the MD-PDKC 100C assumes control and executes the processing of loop (A) (Step S24 through Step S28) targeted at the addresses of the areas for which the MS-PVOL 105 data migration has yet to be completed, thereby executing the data migration from the MS-PVOL 105 to the MD-PVOL 112 (FIG. 6 (2)). In the explanation of the processing in the loop (A), an address targeted for processing will be referred to as a target address.

Specifically, the MD-PDKC 100C, posing as the host 200, sends a read command for reading the target address of the MS-PVOL 105 in the MS-PDKC 100A (Step S24). Upon receiving this read command, the MS-PDKC 100A reads the data of the PVOL 105 target-address in accordance with the read command (Step S25), and sends the read result and the data that was read (read data) to the source of the read command (Step S26). The MS-PDKC 100A perceives the read command source as being the host 200 here, and as such, perceives that the read result and the read data are being sent to the host 200, but actually the read result and the read data are sent to the MD-PDKC 100C posing as the host 200.

The MD-PDKC 100C writes the read data received from the MS-PDKC 100A to the target address in the MD-PVOL 112 (Step S27), and updates the bit of the area corresponding to the target address in the difference bitmap 113 to a value showing that data migration has been completed (Step S28).

Then, after executing the loop (A) processing for all of the addresses in the MS-PVOL 105 for which data migration has not been completed, the MD-PDKC 100C ends the processing.

According to this processing, all of the data in the PVOL 105 in the MS-PDKC 100A is migrated to the MD-PVOL 112 in the MD-PDKC 100C.

Next, the read command processing in a case where the MD-PDKC 100C has received a read command from the host 200 with respect to the PVOL 105 part way through a PVOL migration process will be explained.

Figure 7:
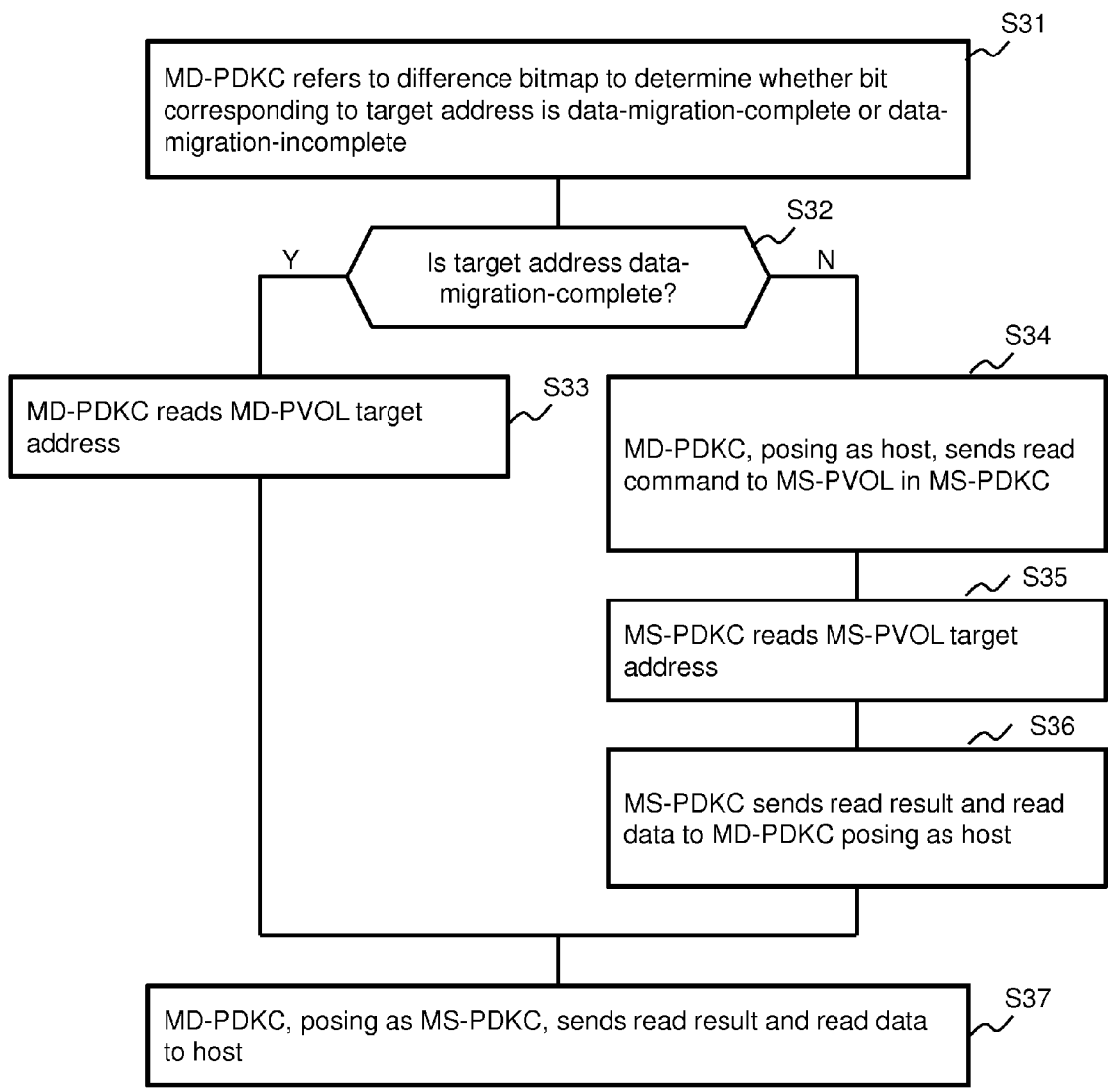
FIG. 7 is a flowchart of read command processing at PVOL migration.
Figure 8:
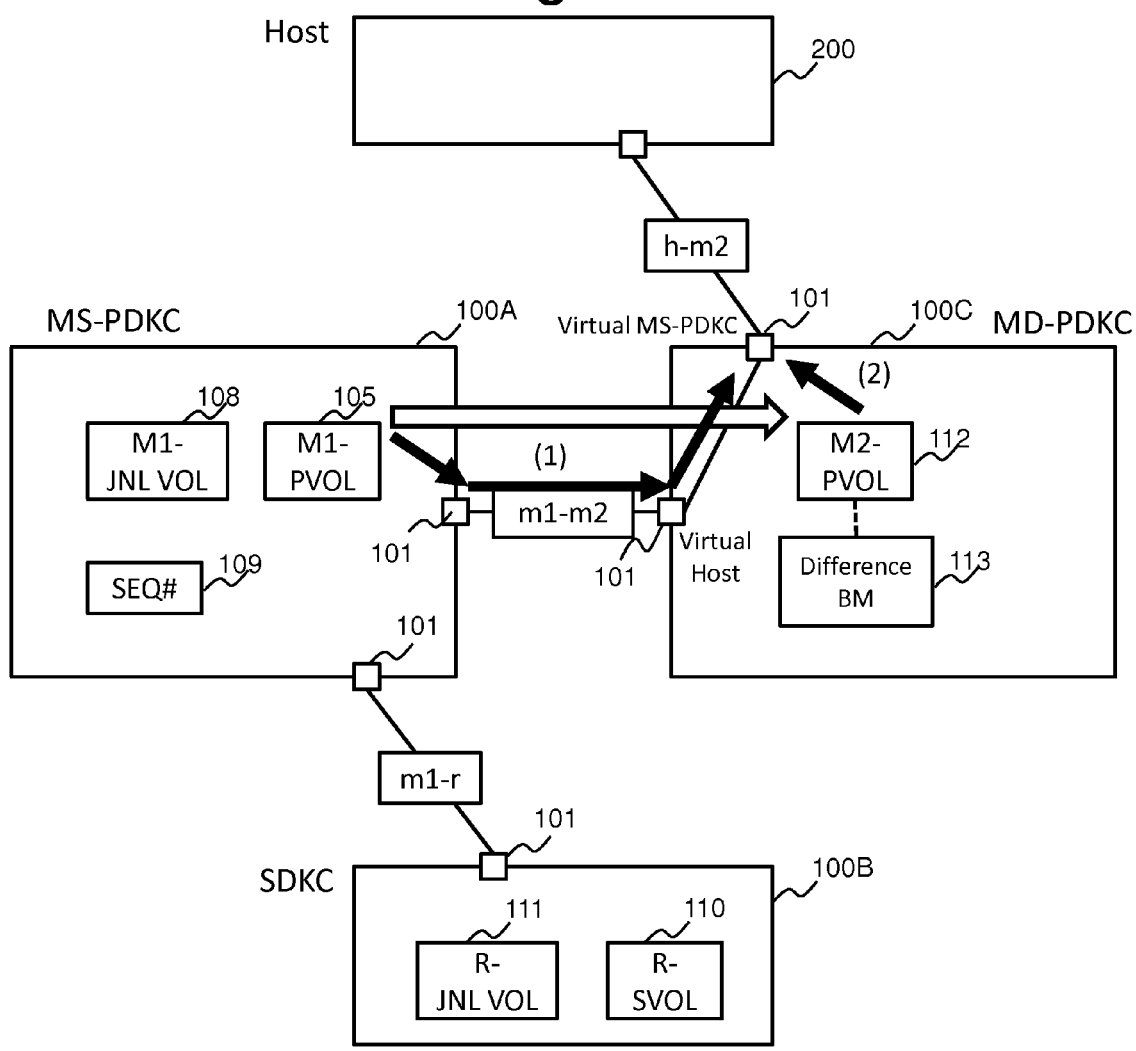
FIG. 8 is a drawing illustrating the read command processing at PVOL migration.

FIG. 7 is a flowchart of read command processing at the time of a PVOL migration. FIG. 8 is a drawing illustrating the read command processing at the time of the PVOL migration.

The MD-PDKC 110C, upon receiving a read command from the host 200 with respect to the PVOL 105, refers to the difference bitmap 113, and determines whether the value of the bit corresponding to an address targeted by the read command (referred to as the target address in the explanation of the read command processing) is a data-migration-complete value or a data-migration-incomplete value (Step S31). In a case where the result of this is that the value of the bit corresponding to the target address is a data-migration-complete value (Step S32: Y), the MD-PDKC 100C reads the target address of the MD-PVOL 112 (Step S33, FIG. 8 (2)) and advances the processing to Step S37.

Alternatively, in a case where the value of the bit corresponding to the target address is not a data-migration-complete value (Step S32: N), the MD-PDKC 100C reads the target address data from the PVOL 105 in the MS-PDKC 100A (Steps S34 through S36, FIG. 8 (1)). That is, the MD-PDKC 100C poses as the host 200 and sends a read command for reading the target address of the MS-PVOL 105 in the MS-PDKC 100A (Step S34). Upon receiving this read command, the MS-PDKC 100A reads the target address data of the PVOL 105 in accordance with the read command (Step S35), and sends the read result and read data to the source of the read command (Step S36). The MS-PDKC 100A perceives the read command source as being the host 200 here, and as such, perceives that the read result and the read data are being sent to the host 200, but actually the read result and the read data are sent to the MD-PDKC 100C posing as be the host 200. Thereafter, the MD-PDKC 100C receives the read result and the read data sent from the MS-PDKC 100A and advances the processing to Step S37.

In Step S37, the MD-PDKC 100C, posing as the MS-PDKC 100A, sends the acquired read result and read data to the host 200, which is the source of the read command, and ends the read command processing. In accordance with this, the host 200, which sent the read command, acquires the read result and the read data as information that was sent from the MS-PDKC 100A.

According to the read command processing, the read data migrated to the MD-PVOL 112 is read from the MD-PVOL 112, and as such can be read faster than when read from the PVOL 105.

Next, the write command processing in a case where the MD-PDKC 100C has received a write command from the host 200 with respect to the PVOL 105 part way through a PVOL migration process will be explained.

Figure 9:
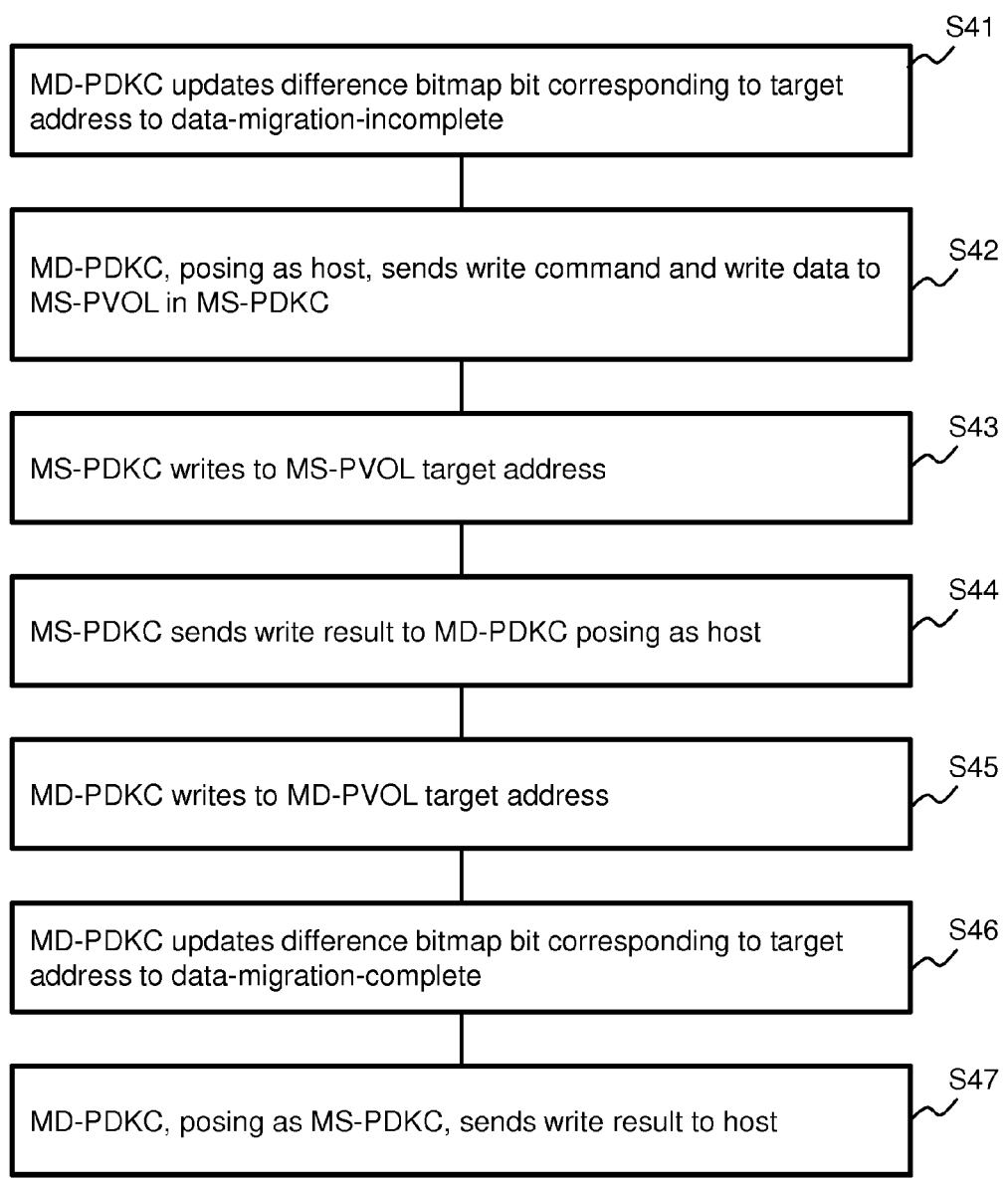
FIG. 9 is a flowchart of write command processing at PVOL migration.
Figure 10:
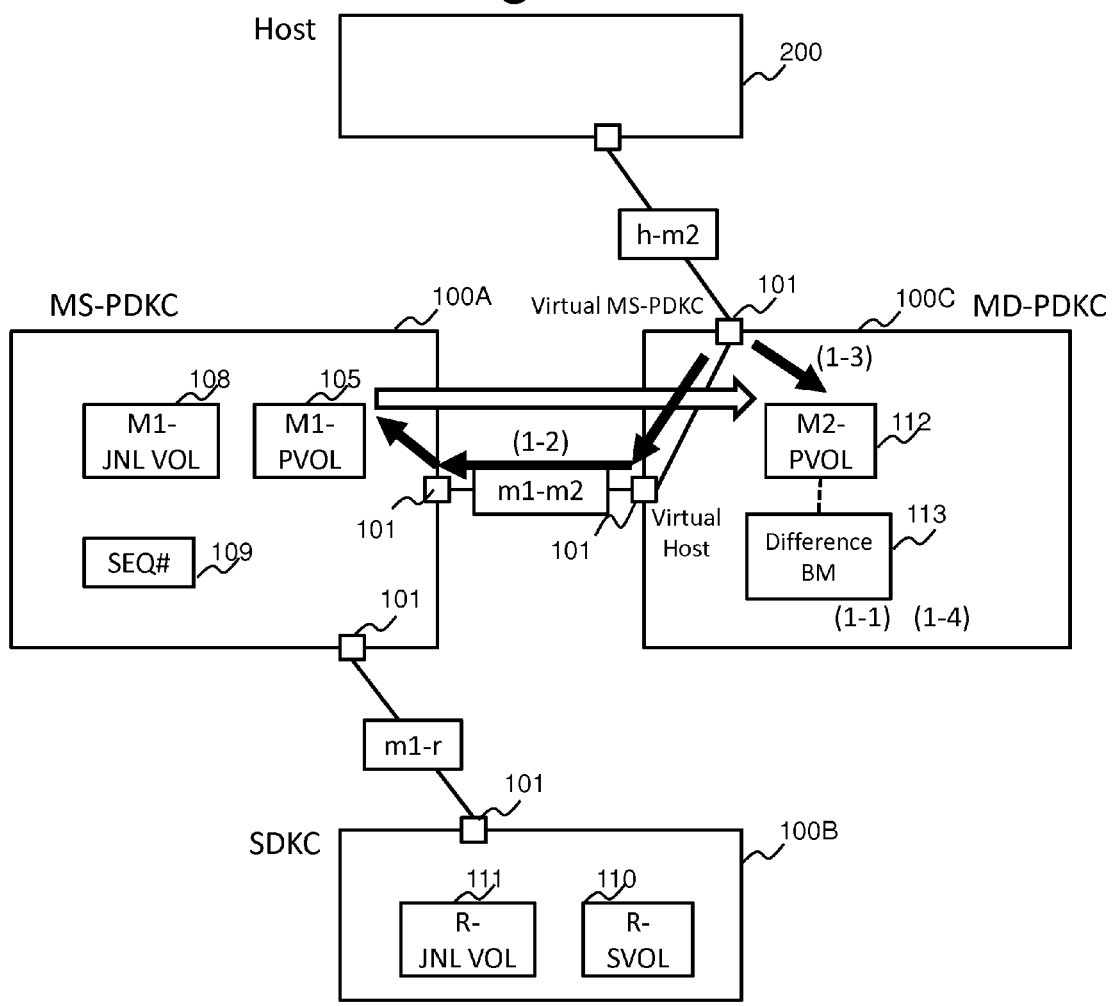
FIG. 10 is a drawing illustrating the write command processing at PVOL migration.

FIG. 9 is a flowchart of write command processing at the time of a PVOL migration. FIG. 10 is a drawing illustrating the write command processing at the time of the PVOL migration.

The MD-PDKC 100C, upon receiving a write command and write-target data (write data) for the PVOL 105 from the host 200, stores the write data in a cache memory of the CMPK 103, and, in addition, updates the value of a difference bitmap 113 bit corresponding to an address being targeted by the write command (referred to as the target address in the explanation of the write command processing) to a data-migration-incomplete value (Step S41, FIG. 10 (1-1)).

Next, the MD-PDKC 100C poses as the host 200 and sends the write command and the write data to be written to the target address of the MS-PVOL 105 in the MS-PDKC 100A (Step S42, FIG. 10 (1-2)).

Upon receiving this write command and write data, the MS-PDKC 100A writes the write data to the target address in the PVOL 105 (Step S43), and sends the write result to the source of the write command (MD-PDKC 100C) (Step S44). This makes it possible to appropriately store the write data in the PVOL 105, and to maintain the PVOL 105 as the latest data until the migration of the PVOL 105 has ended. A journal showing update content corresponding to the write command is created in the MS-PDKC 100A, a sequence number showing the latest sequence is given in the journal, the journal is stored in the PJVOL 108, and the sequence number showing the latest sequence is stored in the sequence information 109.

The MD-PDKC 100C, in a case where, upon receiving the write result sent from the MS-PDKC 100A, the write result is normal-end, writes the read data stored in the cache memory of the CMPK 103 to the target address in the MD-PVOL 112 (Step S45, FIG. 10 (1-3)), and updates the value of the difference bitmap 113 bit corresponding to the target address to the data-migration-complete value (Step S46, FIG. 10 (1-4)). In accordance with this, the write data is also appropriately reflected in the MD-PVOL 112, doing away with the need to migrate the target address data from the PVOL 105 to the MD-PVOL 112 subsequent thereto.

Thereafter, the MD-PDKC 100C poses as the MS-PDKC 100A and sends the acquired write result to the host 200, which is the source of the write command (Step S47), and ends the write command processing. In accordance with this, the host 200, which sent the write command, acquires the write result as information that has been sent from the MS-PDKC 100A.

Next, path addition processing for adding a path between the MD-PDKC 100C and the SDKC 100B will be explained. The path addition processing, for example, may be executed when making preparations for a PVOL 105 migration, or prior to the PVOL 105 migration being completed.

Figure 11:
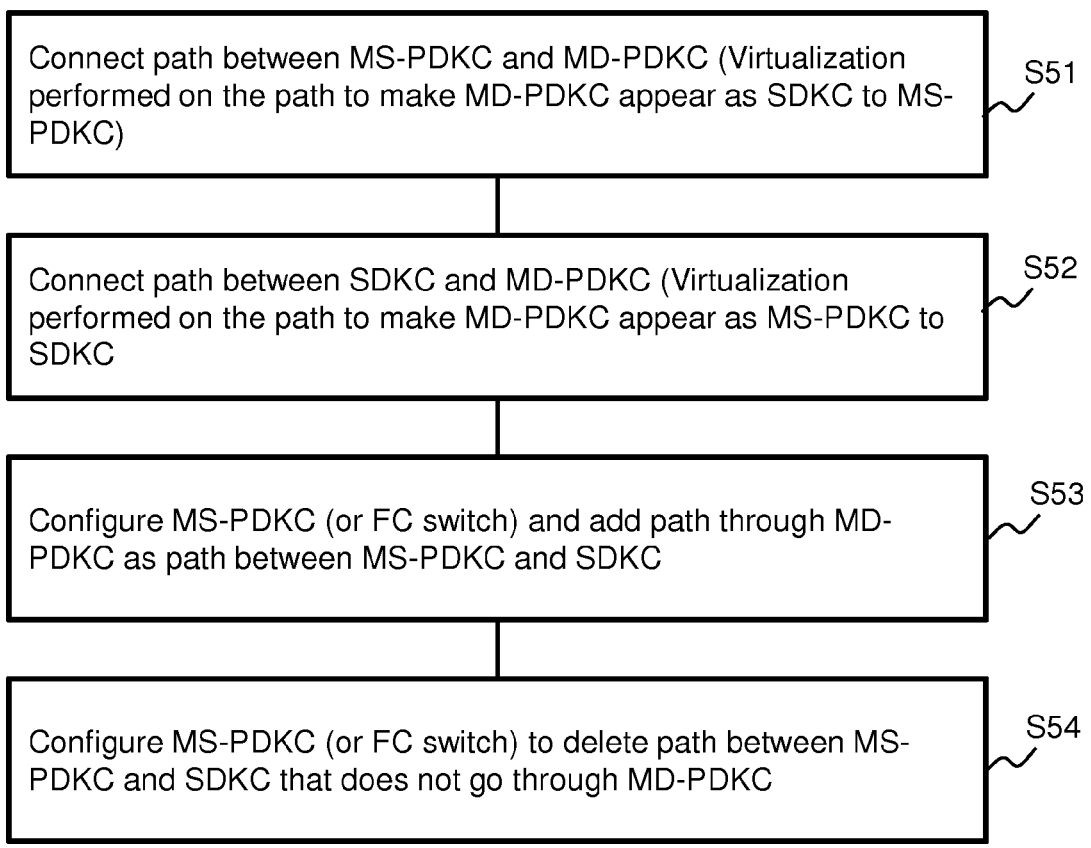
FIG. 11 is a flowchart of processing for adding a path.
Figure 12:
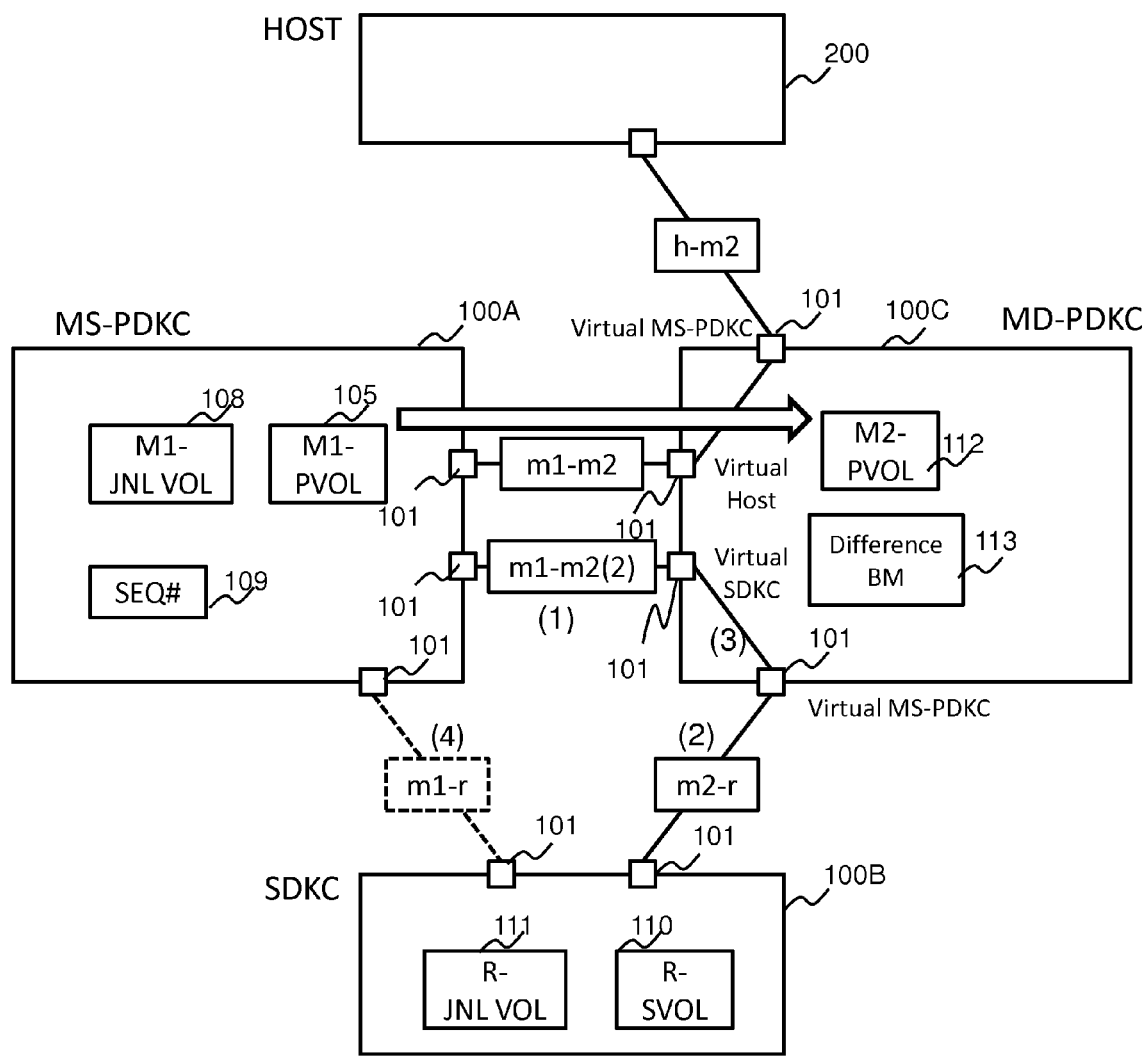
FIG. 12 is a drawing illustrating the processing for adding a path.

FIG. 11 is a flowchart of path addition processing. FIG. 12 is a drawing illustrating the path addition processing.

The administrator connects a path m1-m2(2) between the MS-PDKC 100A and the MD-PDKC 100C (Step S51, FIG. 12 (1)). In this example, virtualization is performed on this path so that the MD-PDKC 100C appears as the SDKC 100B to the MS-PDKC 100A. Specifically, the identification information (port information) of the port 101 in the MD-PDKC 100C configuring this path is virtualized to the same identification information as the identification information of the port 101 (the port 101 connected to the path m2-r) in the SDKC 100B.

Next, the administrator connects a path m2-r between the SDKC 100B and the MD-PDKC 100C (Step S52, FIG. 12 (2)). In this example, virtualization is performed on this path at this time so that the MD-PDKC 100C appears as the MS-PDKC 100A to the SDKC 100B. Specifically, the identification information (port information) of the port 101 in the MD-PDKC 100C configuring this path is virtualized to the same identification information as the identification information of the port 101 (port 101 connected to the path m1-m2(2)) in the MS-PDKC 100A.

Next, the MS-PDKC 100A (or, an FC switch that exists between the MS-PDKC 100A and the SDKC 100B) adds a path (path m1-m2(2)) that goes through the MD-PDKC 100C as the path between the MS-PDKC 100A and the SDKC 100B (Step S53). Thereafter, the MD-PDKC 100C, upon acquiring a command from the SDKC 100B for the MS-PDKC 100A via the path m2-r, transfers this command to the MS-PDKC 100A via the path m1-m2(2) (FIG. 12 (3)).

Next, the MS-PDKC 100A (or, an FC switch that exists between the MS-PDKC 100A and the SDKC 100B) deletes the path (path m1-r) between the MS-PDKC 100A and the SDKC 100B that does not go through the MD-PDKC 100C (Step S54, FIG. 12 (4)). Before deleting the path (path m1-r) that does not go through MD-PDKC 100C, a check may be performed to make sure the command transfer via the path that goes through the MD-PDKC 100C is operating normally. In accordance with this, a command sent from the SDKC 100B to the MS-PDKC 100A always goes through the MD-PDKC 100C. Therefore, a command (RDJNL) for the PJVOL 108 corresponding to the PVOL 105 can reliably be discerned in the MD-PDKC 100C.

Next, processing at the completion of data migration, which is executed when a migration of data from the PVOL 105 to the MD-PVOL 112 has been completed, will be explained.

Figure 13:
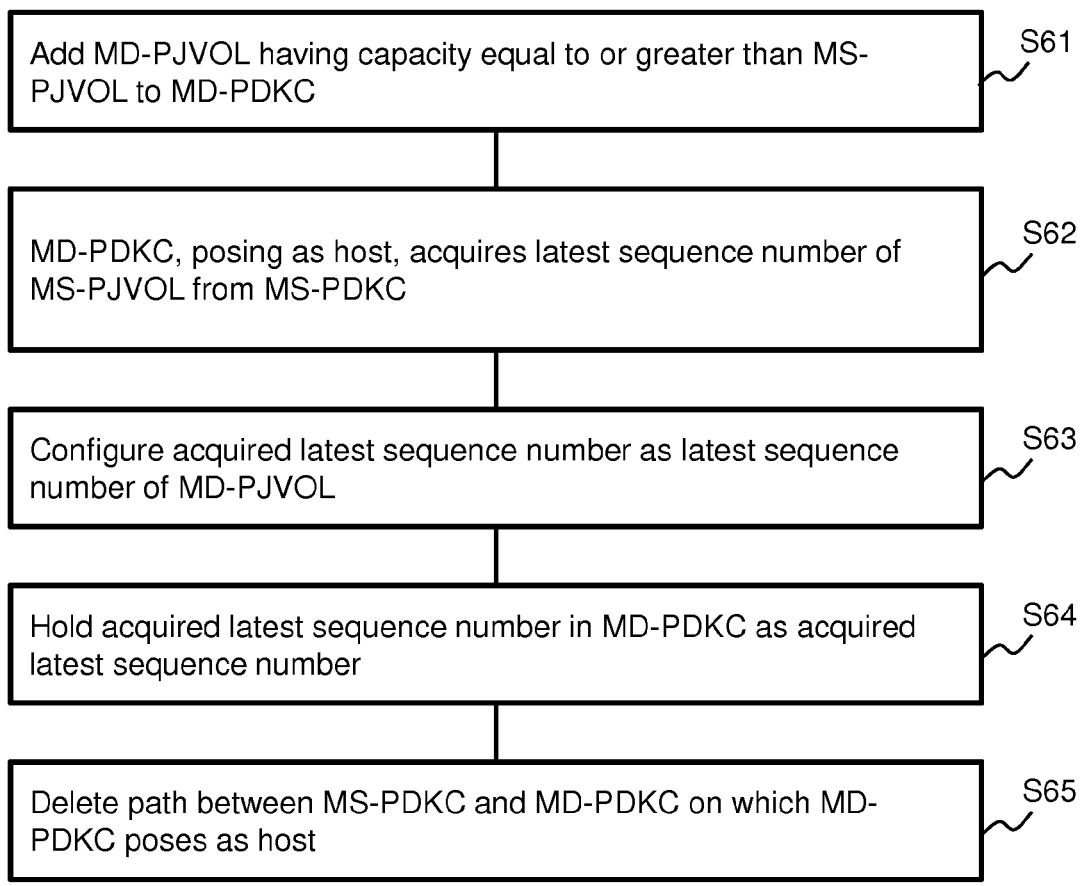
FIG. 13 is a flowchart of processing at the completion of data migration.
Figure 14:
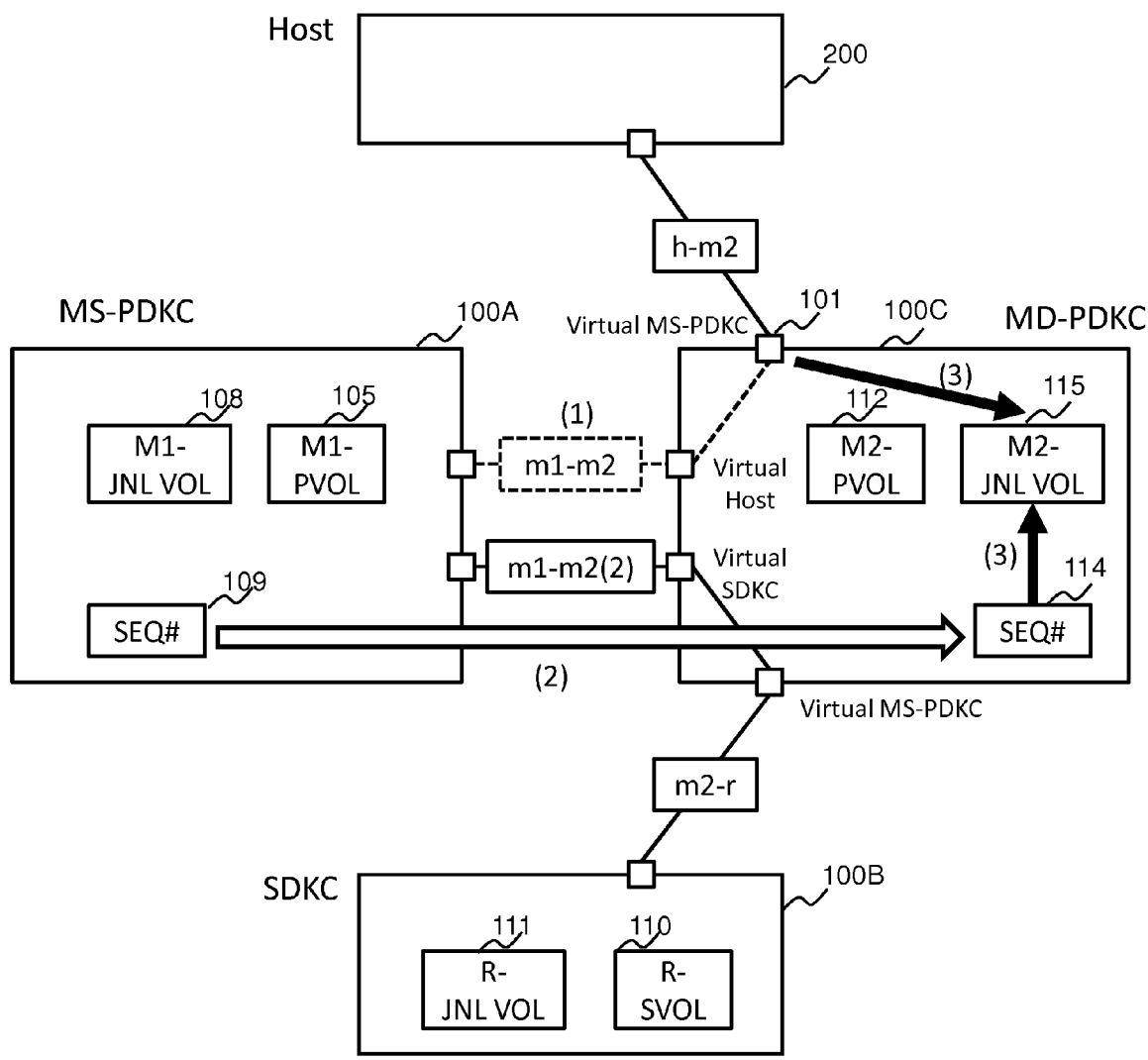
FIG. 14 is a drawing illustrating the processing at the completion of data migration.

FIG. 13 is a flowchart of processing at the completion of data migration. FIG. 14 is a drawing illustrating the processing at the completion of data migration.

After a migration of data from the PVOL 105 to the MD-PVOL 112 has been completed, the MD-PDKC 100C suspends the transfer of an SCSI command from the path h-m2 to the path m1-m2, and adds a VOL (MD-journal VOL 115) of a capacity equal to or greater than the MS-PJVOL 108 to itself (The capacity may also be arbitrarily configured to a capacity that is equal to or less than the MS-PJVOL 108.) (Step S61). The suspension of the transfer of the SCSI command halts the updating of the PVOL 105, the PJVOL 108, and the sequence information 109 in the MS-PDKC 100A.

Next, the MD-PDKC 100C, posing as the host 200, acquires the latest sequence number of the MS-JVOL 108 from the sequence information 109 in the MS-PDKC 100A (Step S62), and stores the acquired latest sequence number in the sequence information 114 as the latest sequence number of the journal in the MD-JVOL 115 (Step S63, FIG. 14 (2)). In a case where the MD-PDKC 100C has received a write command from the host 200 subsequent thereto, the MD-PDKC 100C writes the write data to the MD-PVOL 112 target address in the write command, creates a journal from an update number that includes journal data corresponding to the write data and a sequence number (for example, the sequence number in the sequence information 114+1) based on the sequence number in the sequence information 114 (FIG. 14 (3)), and updates the sequence information 114 to the latest sequence number. This makes it possible to create, in the MD-PDKC 100C, a journal having a sequence that is compatible with that of the journal created in the MS-PDKC 100A.

Next, the MD-PDKC 100C stores the latest sequence number acquired from the MS-PDKC 100A as an acquired latest sequence number (Step S64). The acquired latest sequence number shows that the journals up to this sequence number are stored in the JVOL 108 of the MS-PDKC 100A, and that journals having a larger sequence number are stored in the JVOL 115 of the MD-PDKC 100C.

Next, the MD-PDKC 100C performs a configuration for deleting the path (path m1-m2) between the MS-PDKC 100A and the MD-PDKC 100C on which the MD-PDKC 100C is posing as the host 200 (Step S65, FIG. 14 (1)).

Next, RDJNL command processing, which is executed in a case where the migration-destination storage 100C has received a RDJNL command for reading a journal from the SDKC 100B after processing at the completion of a data migration has ended, will be explained. A sequence number specifying the read-target journal (specified sequence number) is associated with the RDJNL command here.

Figure 15:
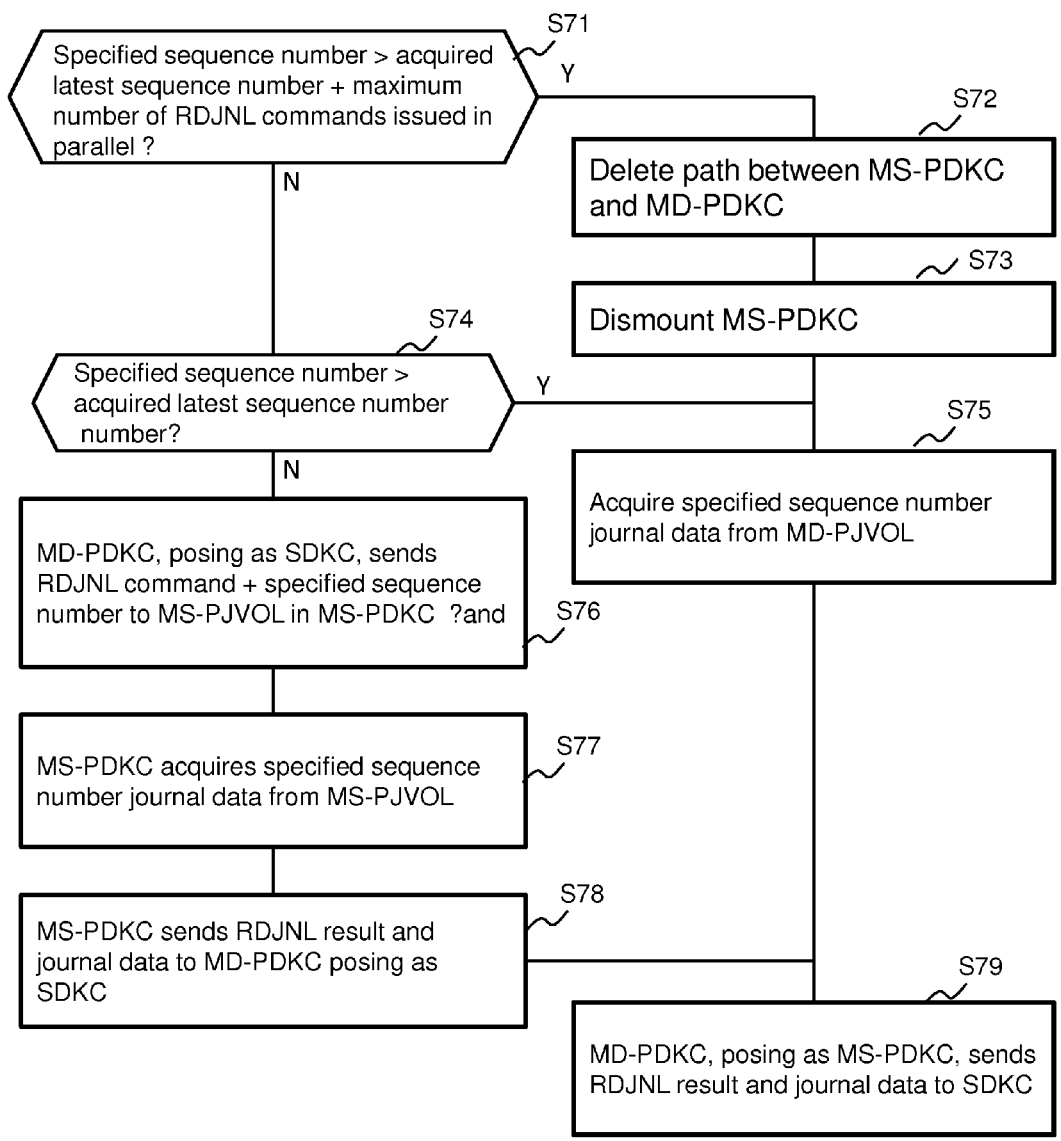
FIG. 15 is a flowchart of RDJNL command processing.
Figure 16:
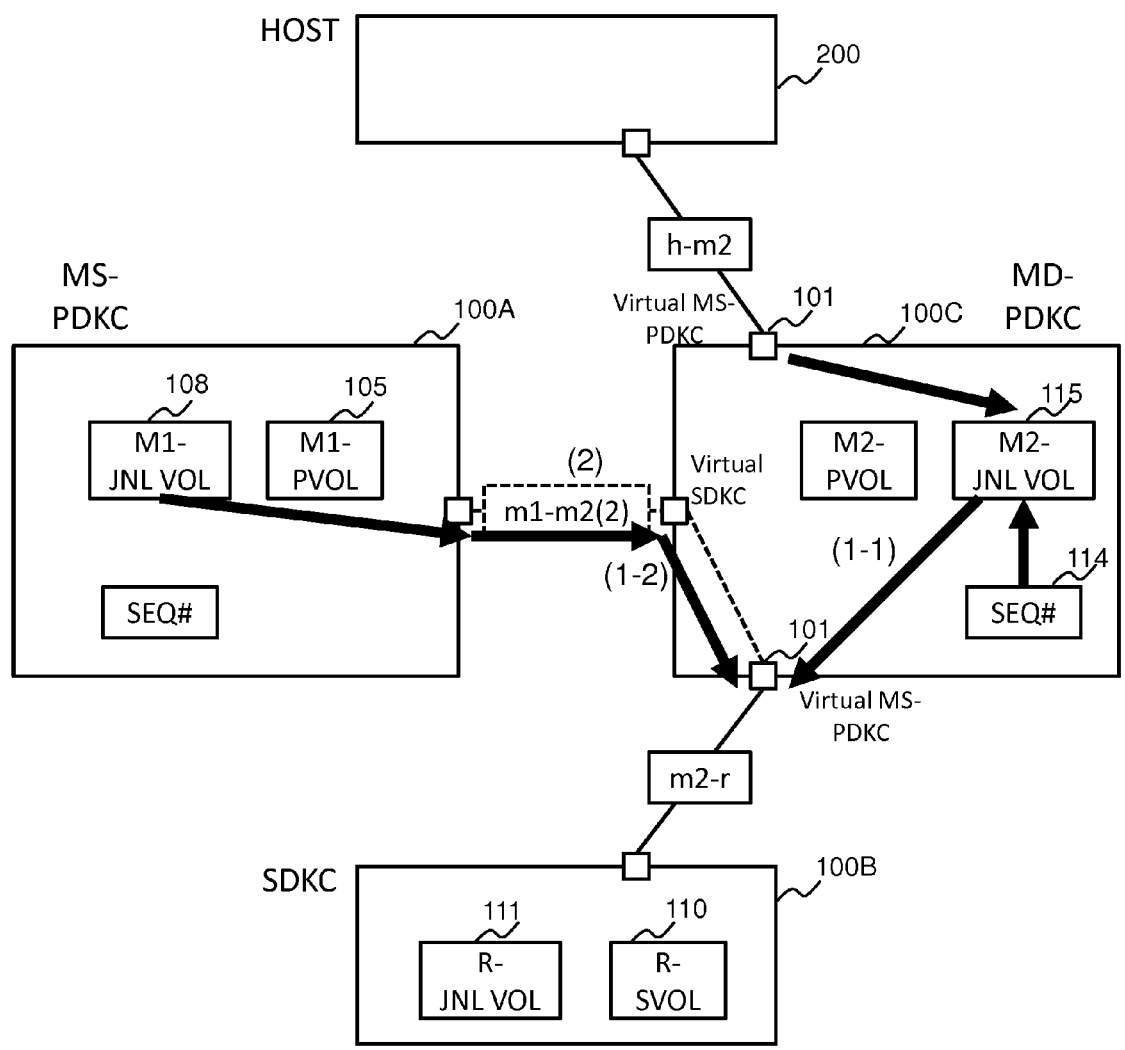
FIG. 16 is a drawing illustrating the RDJNL command processing.

FIG. 15 is a flowchart of RDJNL command processing. FIG. 16 is a drawing illustrating the RDJNL command processing.

The MD-PDKC 100C, upon receiving a RDJNL command and specified sequence number, determines whether or not the sequence information of the journal corresponding to the RDJNL command from the SDKC 100B is sequence information guaranteeing that a RDJNL command targeted at a journal prior to the latest sequence information in the MS-PDKC 110A is not received. Specifically, the MD-PDKC 100C, upon receiving the RDJNL command and the specified sequence number, determines whether or not the specified sequence number is larger than a number obtained by adding the maximum number of RDJNL commands issued in parallel to the acquired latest sequence number (Step S71). The maximum number of RDJNL commands issued in parallel here shows, in a case where RDJNL commands are capable of being issued in parallel, the maximum value of a difference in sequence numbers for which JNL request and reception sequence shifting is allowed according to asynchronous remote copy specifications.

A case in which the result is that the specified sequence number is larger than the number obtained by adding the maximum number of RDJNL commands issued in parallel to the acquired latest sequence number (Step S71: Y) signifies that a RDJNL command for reading a journal stored in the JVOL 108 of the MS-PDKC 100A does not exist even when the allowable sequence shifting of the specified sequence number in the RDJNL command is taken into account. Consequently, the migration-destination storage 100C deletes the path between MS-PDKC 100A and the migration-destination storage 100C (Step S72, FIG. 16 (2)), thereby making it possible for the administrator to dismount the MS-PDKC 100A (Step S73), and advances the processing to Step S75. At this time, the MD-PDKC 100C can notify the management terminal to the effect that the transfer of the MS-PDKC 100A JNL has ended (the MS-PDKC 100A is able to be dismounted).

Alternatively, in a case where the specified sequence number is not larger than the number obtained by adding the maximum number of RDJNL commands issued in parallel to the acquired latest sequence number (Step S71: N), an RDJNL command for reading a journal stored in the JVOL 108 of the MS-PDKC 100A could exist, and as such, the MD-PDKC 100C advances the processing to Step S74.

In Step S74, the MD-PDKC 100C determines whether or not the specified sequence number is larger than the acquired latest sequence number. A case in which the result is that the specified sequence number is larger than the acquired latest sequence number (Step S74: Y) signifies that the journal corresponding to the specified sequence number is stored in the JVOL 115 of the MD-PDKC 100C, and as such, the MD-PDKC 100C advances the processing to Step S75. A case in which the specified sequence number is not larger than the acquired latest sequence number (Step S74: N) signifies that the journal corresponding to the specified sequence number is stored in the JVOL 108 of the MS-PDKC 100A, and as such, the MD-PDKC 100C advances the processing to Step S76.

In Step S75, the MD-PDKC 100C acquires the journal (journal data and update information) corresponding to the specified sequence number from the JVOL 115 (FIG. 16 (1-1)), and advances the processing to Step S79.

In Step S76, the MD-PDKC 100C, posing as the SDKC 110B, sends the RDJNL command and the specified sequence number to the MS-JVOL 108 in the MS-PDKC 100A. As a result of this, the MS-PDKC 100B acquires from the MS-JVOL 108 the data in the journal corresponding to the specified sequence number (Step S77), and sends the result of the RDJNL command execution and the acquired journal data to the source of the RDJNL command (Step S78). The MD-PDKC 100C acquires the RDJNL command execution result and the acquired journal from the MS-PDKC 100A (FIG. 16 (1-2)) and advances the processing to Step S79.

In Step S79, the MD-PDKC 100C, posing as the MS-PDKC 100A, sends the RDJNL command execution result and the acquired journal to the SDKC 100B. This makes it possible for the SDKC 100B to appropriately acquire a required journal and to store this journal in the SJVOL 111.

Next, the computer system that exists after the MS-PDKC 100A has been dismounted from the computer system shown in FIG. 16 will be explained.

Figure 17:
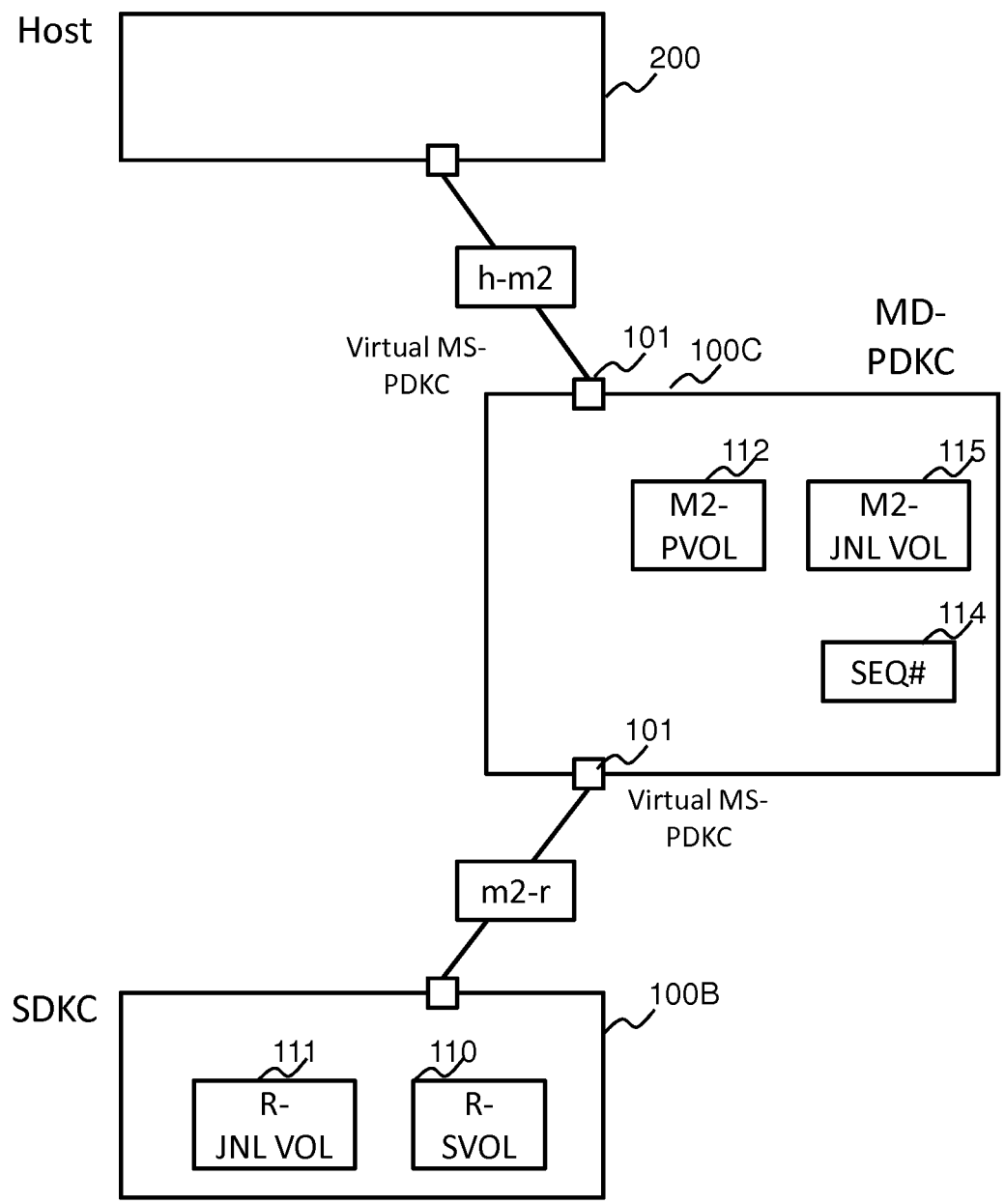
FIG. 17 is a drawing showing an example of the configuration of a computer system after dismounting a MS-PDKC.

FIG. 17 is a drawing showing an example of the configuration of the computer system after the MS-PDKC has been dismounted.

As shown in FIG. 17, the MD-PDKC 100C poses as the MS-PDKC 100A with respect to the host 200 in communications via the path h-m2. Also, the MD-PDKC 100C poses as the MS-PDKC 100A with respect to the SDKC 100C in communications via the path m2-r.

Figure 18:
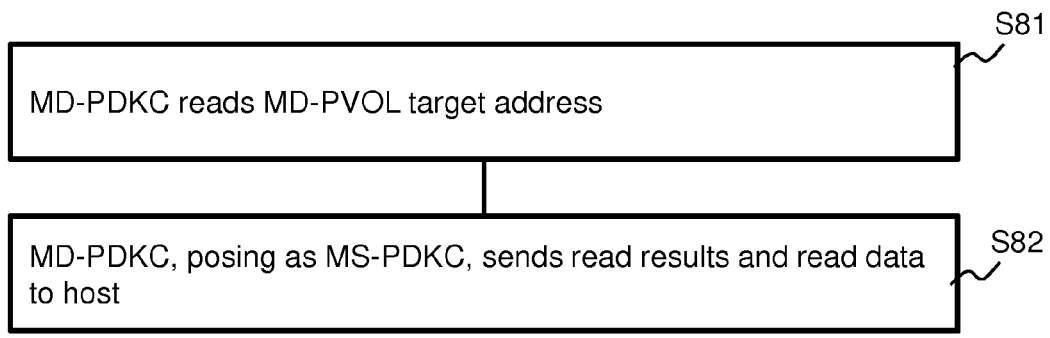
FIG. 18 is a flowchart of read command processing after a data migration has ended.

FIG. 18 is a flowchart of read command processing after a data migration has ended.

This read command processing is executed when the MD-PDKC 100C, which is posing as the MS-PDKC 100A, has received a read command from the host 200 for the PVOL 105 of the MS-PDKC 100A after a data migration has ended.

The MD-PDKC 100C, upon having received a read command specifying the ID of the PVOL 105 from the host 200, reads data of the MD-PVOL 112 target address in the read command (Step S81), and, posing as the MS-PDKC 100A, sends the read command execution result and the read data to the host 200 (Step S82). Furthermore, the device information (identification information) for identifying the MD-PVOL 112 may be virtualized to the same device information as that of the PVOL 105.

Figure 19:
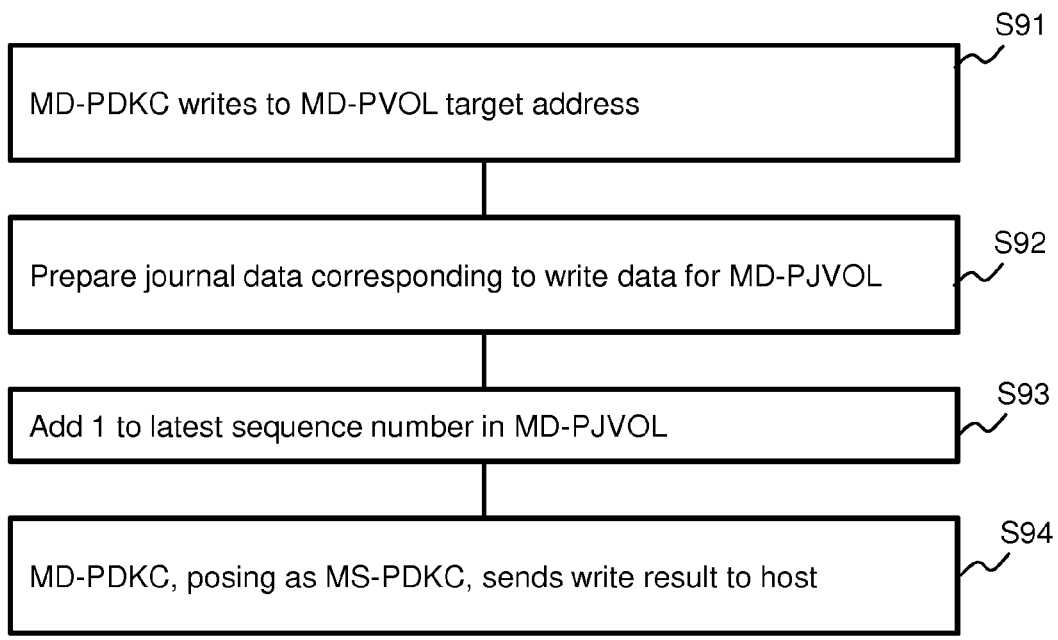
FIG. 19 is a flowchart of write command processing after a data migration has ended.

FIG. 19 is a flowchart of write command processing after a data migration has ended.

This write command processing is executed when the MD-PDKC 100C, which is posing as the MS-PDKC 100A, has received a write command and write data from the host 200 for the PVOL 105 of the MS-PDKC 100A after a data migration has ended.

The MD-PDKC 100C, upon having received a write command from the host 200, writes the write data to the MD-PVOL 112 target address in the write command (Step S91), creates a journal corresponding to the write data, and associates a sequence number based on the sequence number in the sequence information 114 (for example, the sequence number in the sequence information 114+1) with the journal (Step S92). This makes it possible to create a journal in the MD-PDKC 100C that is sequentially compatible with the journal created in the MS-PDKC 100A.

Next, the MD-PDKC 100C updates the latest sequence number by adding 1 to the sequence number in the sequence information 114 (Step S93). Next, the MD-PDKC 100C, posing as the MS-PDKC 100A, sends the write command execution result to the host 200 (Step S94). This makes it possible to appropriately store the write data in the MD-PVOL 112, and, in addition, to allocate an appropriate sequence number to the journal in accordance with the sequence number in the sequence information 114.

Example 2

Next, a computer system related to Example 2 will be explained. The points of difference with Example 1 will be explained for the most part hereinbelow, and explanations of the points in common with Example 1 will either be simplified or omitted.

Figure 20:
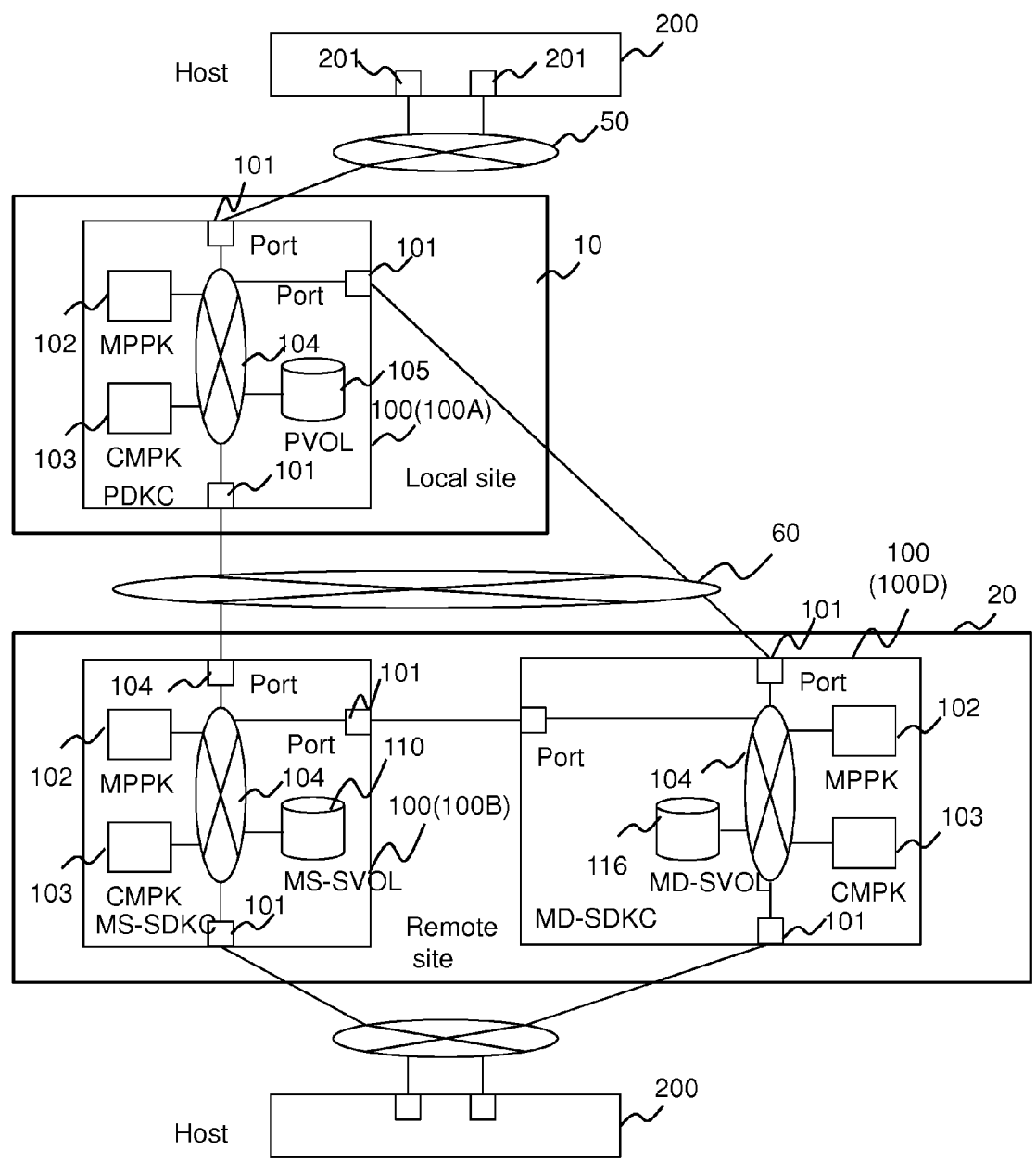
FIG. 20 is a drawing showing an example of the configuration of a computer system related to Example 2.

FIG. 20 is a drawing showing an example of the configuration of a computer system related to Example 2.

The computer system comprises one or more hosts 200, and one or more DKCs 100.

The host 200 issues an access command with respect to the PVOL 105 managed by the DKC 100 to the DKC 100. The host 200 comprises one or more ports 201. The port 201 is an example of a communication interface device, and is an interface for connecting to a network. Identification information (for example, a world wide name (WWN) or the like) that makes it possible to uniquely identify a port is configured in the port 201. The host 200 manages information regarding a path to a DKC 100, this information being associated with the identification information of an access-target VOL (for example, the device number) and the identification information (the port information) of the port 101 in the DKC 100 accessed when accessing the VOL.

A PDKC 100A is coupled to an MS-SDKC 100B via a communication network 60. A MD-SDKC 100D is installed in a remote site 20, which is a place that is separated from a local site 10. The PDKC 100A is coupled to the MD-SDKC 100D via the communication network 60. The MS-SDKC 100B and the MD-SDKC 100D are communicably coupled to one another.

The DKCs 100 (100A, 100B, 100D), for example, comprise multiple ports 101, one or more microprocessor packages (MPPKs) 102, one or more cache memory packages (CMPKs) 103, an internal network 104, and a PDEV for configuring one or more VOLs. A VOL is configured using one or more PDEVs. The port 101, the MPPK 102, the CMPK 103, and the VOL-configuring PDEV are communicably coupled via the internal network 104.

For example, the PDKC 100A provides a PVOL 105. The MS-SDKC 100B provides a MS-SVOL 110. The MD-SDKC 100D provides a MD-SVOL 116.

The port 101 is an example of a communication interface device, and is an interface for connecting to a network. Identification information (for example, a world wide name (WWN) or the like) that makes it possible to uniquely identify a port is configured in the port 101. Arbitrary identification information (virtual identification information) can be virtually allocated to the port 101 and used in communications.

In this example, for example, the PDKC 100A comprises a port 101 for coupling to the host 200, a port 101 for coupling to the MS-SDKC 100B, and a port 101 for coupling to the MD-SDKC 100D.

The MS-SDKC 100B comprises a port 101 for coupling to the host 200, a port 101 for coupling to the PDKC 100A, and a port 101 for coupling to the MD-SDKC 100D.

The MD-SDKC 100D comprises a port 101 for coupling to the host 200, a port 101 for coupling to the PDKC 100A, and a port 101 for coupling to the MS-SDKC 100B.

The MPPK 102 is a control device comprising either one or multiple processors. The processor executes various processes in accordance with a program. The MPPK 102 may comprise a memory for storing a program executed by the processor, and data that is to be used. In this example, the MPPK 102 of the MD-SDKC 100D comprises a program for realizing a new function in this example, which will be explained further below. The MPPK 102 in the PDKC 100A and the MS-SDKC 100B may comprise existing programs.

The CMPK 103 includes one or more cache memories. The one or more cache memories are a volatile memory and/or a nonvolatile memory. The one or more cache memories may comprise, in addition to a storage area (hereinafter, cache area) for temporarily storing data input/output to/from the PDEV, a storage area (hereinafter, shared area) for storing information that is used by the MPPK 102 processor.

Figure 21:
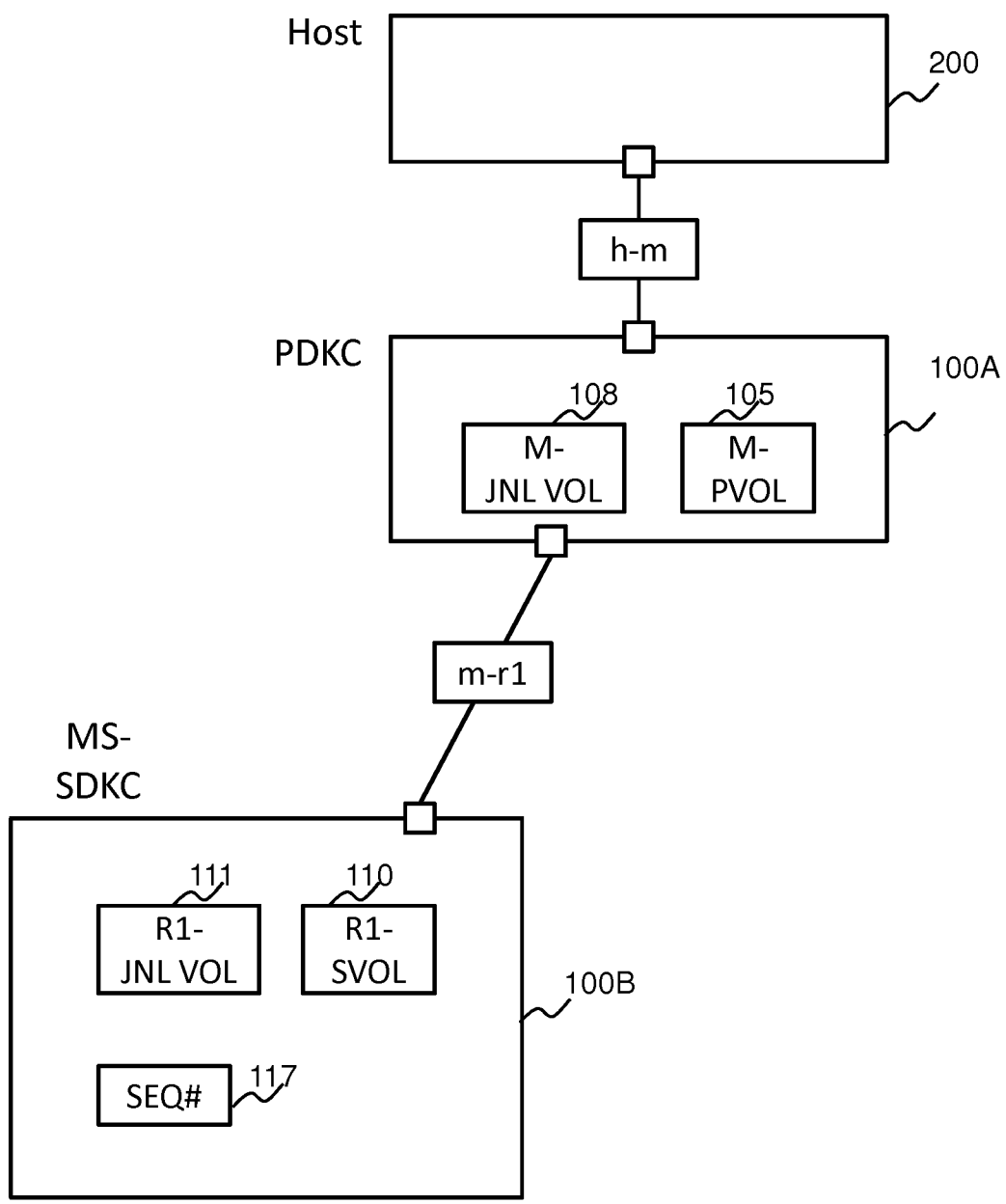
FIG. 21 is a drawing showing an example of the configuration of the computer system in an initial state prior to starting a data migration.

FIG. 21 is a drawing showing an example of the configuration of the computer system in an initial state prior to starting a migration.

The computer system, in the initial state, comprises a host 200, a PDKC 100A, and an MS-SDKC 100B.

The PDKC 100A comprises a PVOL 105, and a JVOL 108 for storing a journal (JNL) showing update content with respect to the PVOL 105

The MS-SDKC 100B stores an MS-SVOL 110 that configures a pair with the PVOL 105, an SJVOL 111 for storing a journal acquired from the PDKC 100A, and formalized sequence information 117 for storing a sequence number of a journal that has been formalized (reflected) in the SJVOL 110 (a formalized sequence number).

A path h-m is formed between the host 200 and the PDKC 100A. For example, an SCSI command such as either a read command or a write command is sent from the host 200 to the PDKC 100A via the path h-m.

A path m-r1 is formed between the PDKC 100A and the migration-source SVOL 100B. For example, a command (asynchronous remote copy command) is sent from the MS-SDKC 100B to the PDKC 100A via the path m-r1. As a command that is sent, for example, there is a command (RD-JNL command) for reading a journal of the JVOL 108 in the PDKC 100A.

Next, MD-SDKC connections configuration processing in preparation for migrating an SVOL will be explained.

Figure 22:
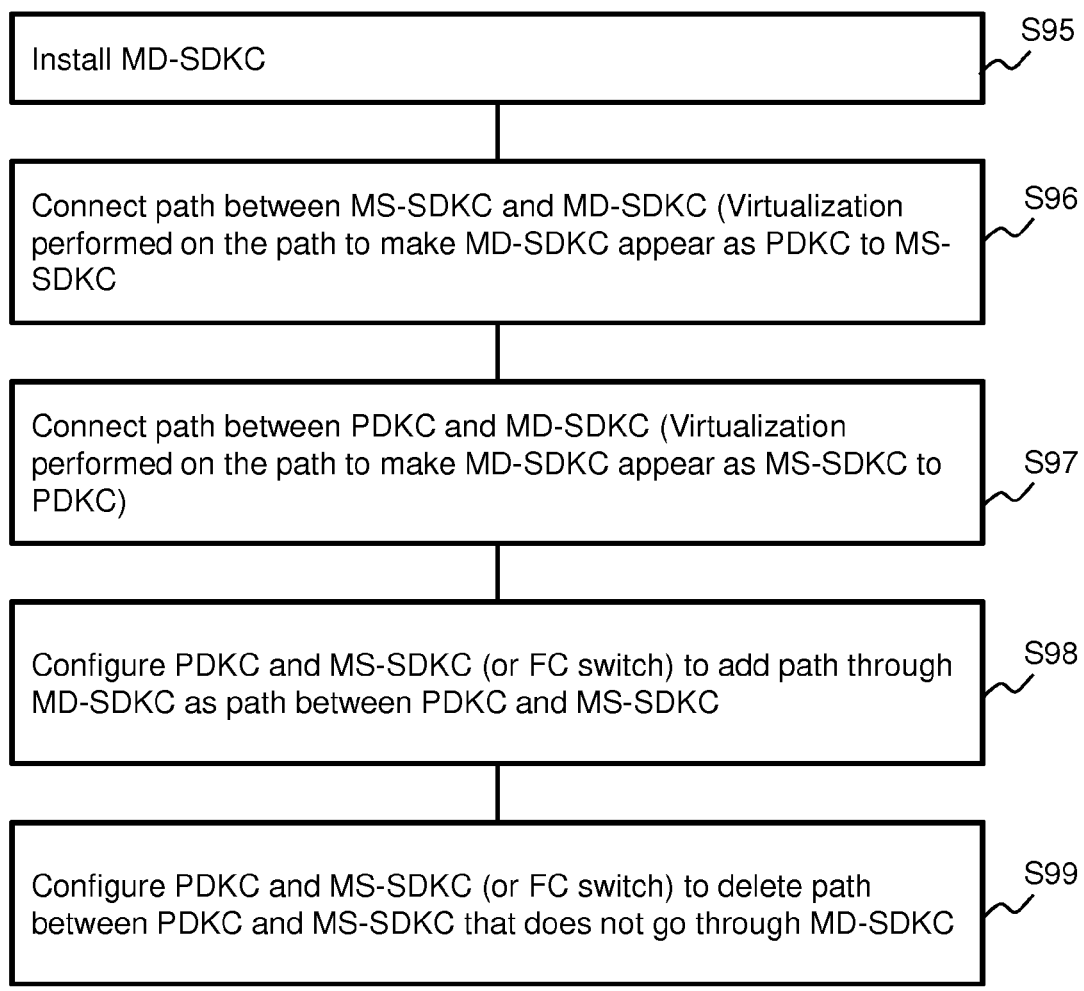
FIG. 22 is a flowchart of MD-SDKC connection configuration processing.
Figure 23:
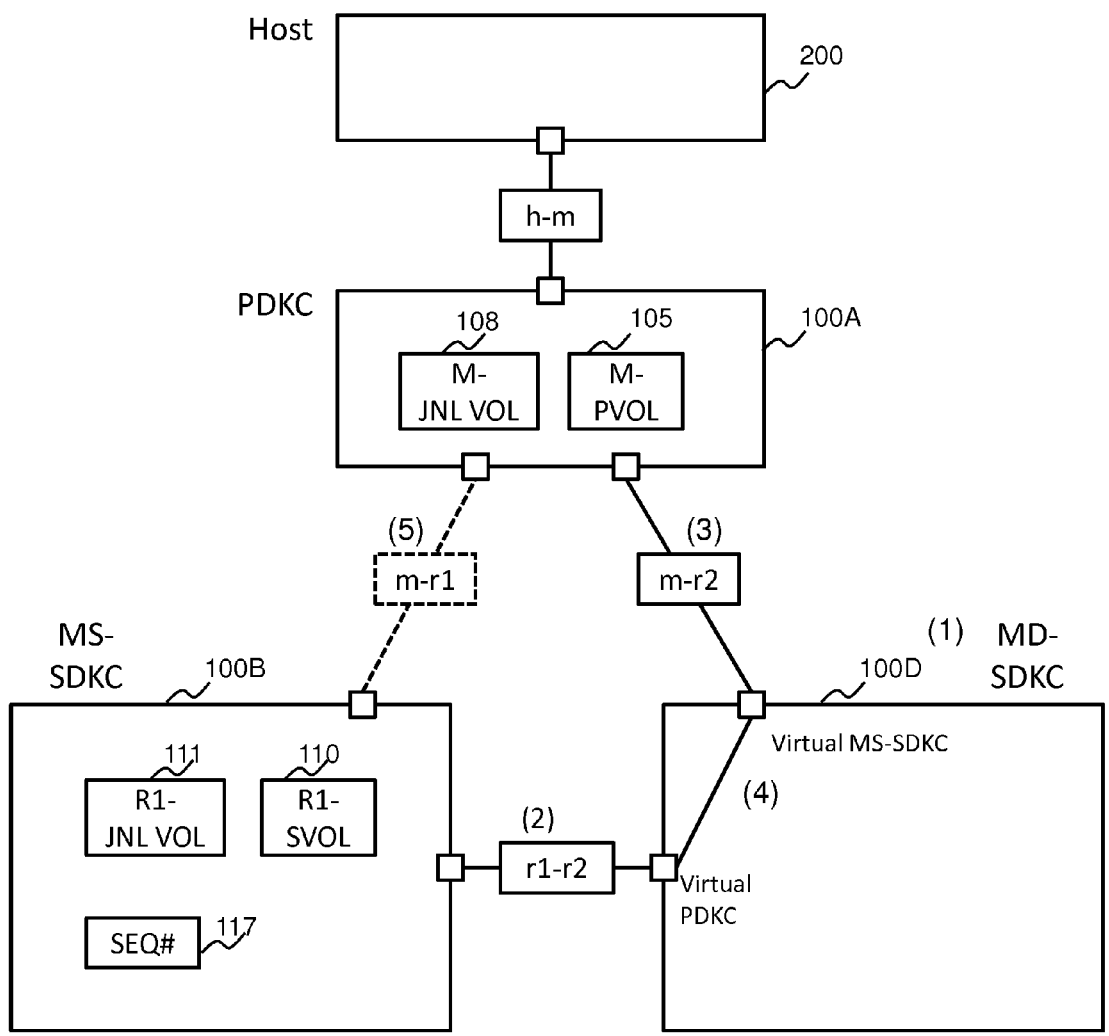
FIG. 23 is a drawing illustrating the MD-SDKC connection configuration processing.

FIG. 22 is a flowchart of MD-SDKC connection configuration processing. FIG. 23 is a drawing illustrating the MD-SDKC connection configuration processing.

First, the administrator installs the MD-SDKC 100D for storing the MD-SVOL 116, for example, at the remote site 20 (Step S95, FIG. 23 (1)). At this point in time, the MD-SDKC 100D is physically coupled to the networks 50 and 60, and is also physically coupled to the MS-SDKC 100B.

Next, the administrator connects a path r1-r2 between the MS-SDKC 100B and the MD-SDKC 100D (Step S96, FIG. 23 (2)). As the method for connecting the path here, there is a method in which the administrator makes the configurations using a terminal of a Service Processor (SVP) coupled to the MD-SDKC 100D and/or a not-shown management apparatus or the like coupled via a network. There may be cases where the operations and settings performed by the administrator using the SVP or other such terminal are explained giving the "administrator" as the doer of the action without specifying the terminal or the like, but the actual doer of the action may be interpreted as the management apparatus. In this example, virtualization is performed on this path so that the MD-SDKC 100D appears as the PDKC 100A to the MS-SDKC 100B. Specifically, the identification information (port information) of the port 101 in the MD-SDKC 100D that configures this path is virtualized to the same identification information as the identification information of the port 101 (port 101 connected to the path m-r2) in the PDKC 100A.

Next, the administrator connects the path m-r2 between the PDKC 100A and the MD-SDKC 100D (Step S97, FIG. 23 (3)). In this example, the administrator performs virtualization on this path here so that the MD-SDKC 100D appears as the MS-SDKC 100B to the PDKC 100A. Specifically, the identification information (port information) of the port 101 in the MD-SDKC 100D that configures this path is virtualized to the same identification information as the identification information of the port 101 (port 101 connected to the path r1-r2) in the MS-SDKC 100B.

Next, PDKC 100A and the MS-SDKC 100B (or, an FC switch that exists therebetween) adds paths (path m-r2 and path r1-r2) that go through the MD-SDKC 100D as paths between the PDKC 100A and the MS-SDKC 100B (Step S98). Thereafter, the MD-SDKC 100D (specifically, the MPPK 102 processor in the MD-SDKC 100D), upon acquiring a command from the MS-PDKC 100B for the PDKC 100A via the path r1-r2, transfers this command to the PDKC 100A via the path m-r2 (FIG. 23 (4)).

Next, PDKC 100A and the MS-SDKC 100B (or, an FC switch that exists therebetween) deletes the path (path m-r1) between the PDKC 100A and the MS-SDKC 100B that does not go through the MD-SDKC 100D (Step S99, FIG. 23 (5)). Before deleting the path (path m-r1) that does not go through MD-SDKC 100D, a check may be performed to make sure the command transfer via the path that goes through the MD-SDKC 100D is operating normally. In accordance with this, a command (RDJNL command or the like) sent from the MS-SDKC 100B to the PDKC 100A always goes through the MD-SDKC 100D. Therefore, a command can reliably be discerned in the MD-SDKC 100D.

RDJNL command processing executed in a case where the MD-SDKC 100D has received an RDJNL command from the MS-SDKC 100B with respect to the JVOL 108 of the PDKC 100A after the MD-SDKC connection configuration processing has ended will be explained. Firstly, the RDJNL command processing (first time), which is executed in a case where the MD-SDKC 100D has initially received an RDJNL command from the MS-SDKC 100B with respect to the JVOL 108 of the PDKC 100A after the MD-SDKC configuration setting processing has ended, will be explained.

Figure 24:
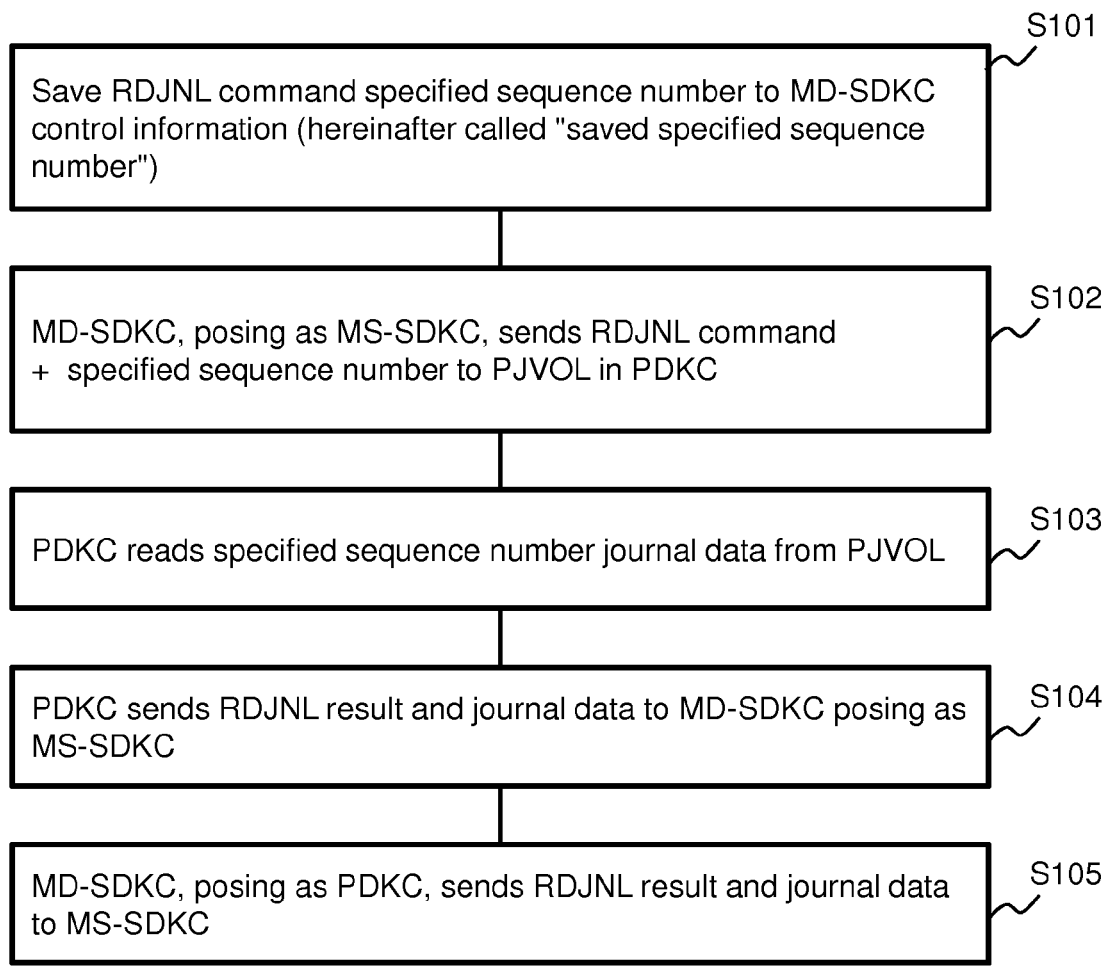
FIG. 24 is a flowchart of RDJNL command processing (first time) prior to starting a data migration.

FIG. 24 is a flowchart of RDJNL command processing (first time) prior to the start of a data migration.

The MD-SDKC 100D, upon initially receiving an RDJNL command from the MS-SDKC 100B for the JVOL 108 in the PDKC 100A, saves the sequence number specified in the received RDJNL command (referred to as the specified sequence number) to its own MPPK 102 memory (Step S101). The specified sequence number saved to memory here is referred to as the saved specified sequence number.

Next, the MD-SDKC 100D, posing as the MS-SDKC 100B, sends the RDJNL command and the specified sequence number to the JVOL 108 in the PDKC 100A (Step S102).

The PDKC 100A, upon receiving the RDJNL command, reads the journal (update information including journal data and the sequence number) corresponding to the specified sequence number from the JVOL 108 (Step S103), and sends the RDJNL command execution result and journal to the source of the RDJNL command (Step S104). The PDKC 100A perceives the source of the RDJNL command as being the MS-SDKC 100B here, and as such, is under the perception that the RDJNL command execution result and journal are being sent to the MS-SDKC 100B, but actually the RDJNL command execution result and the journal are sent to the MD-SDKC 100D that is posing as the MS-SDKC 100B.

Next, the MD-SDKC 100D, upon receiving the RDJNL command execution result and journal from the PDKC 100A, poses as the PDKC 100A and sends the RDJNL command execution result and journal to the MS-SDKC 100B (Step S105). This makes it possible for the MS-SDKC 100B to appropriately acquire the journal corresponding to the specified sequence number. The MS-SDKC 100B stores the acquired journal in the JVOL 111.

Next, the RDJNL command processing (second time and beyond), which is executed in a case where the MD-SDKC 100D has received an RDJNL command two or more times from the MS-SDKC 100B with respect to the JVOL 108 in the PDKC 100A after the MD-SDKC connection configuration processing has ended, will be explained.

Figure 25:
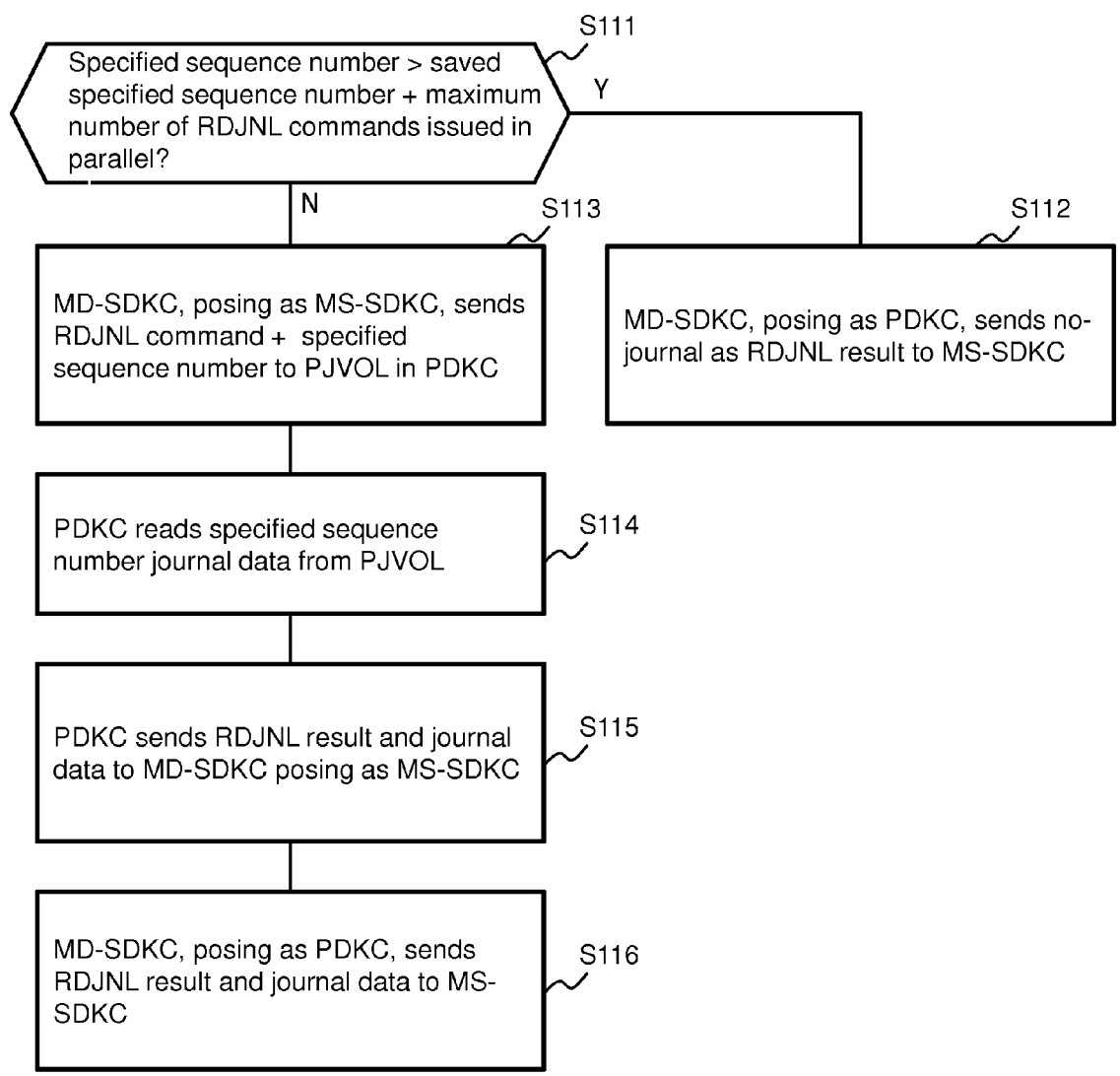
FIG. 25 is a flowchart of RDJNL command processing (second time and beyond) prior to starting a data migration.
Figure 26:
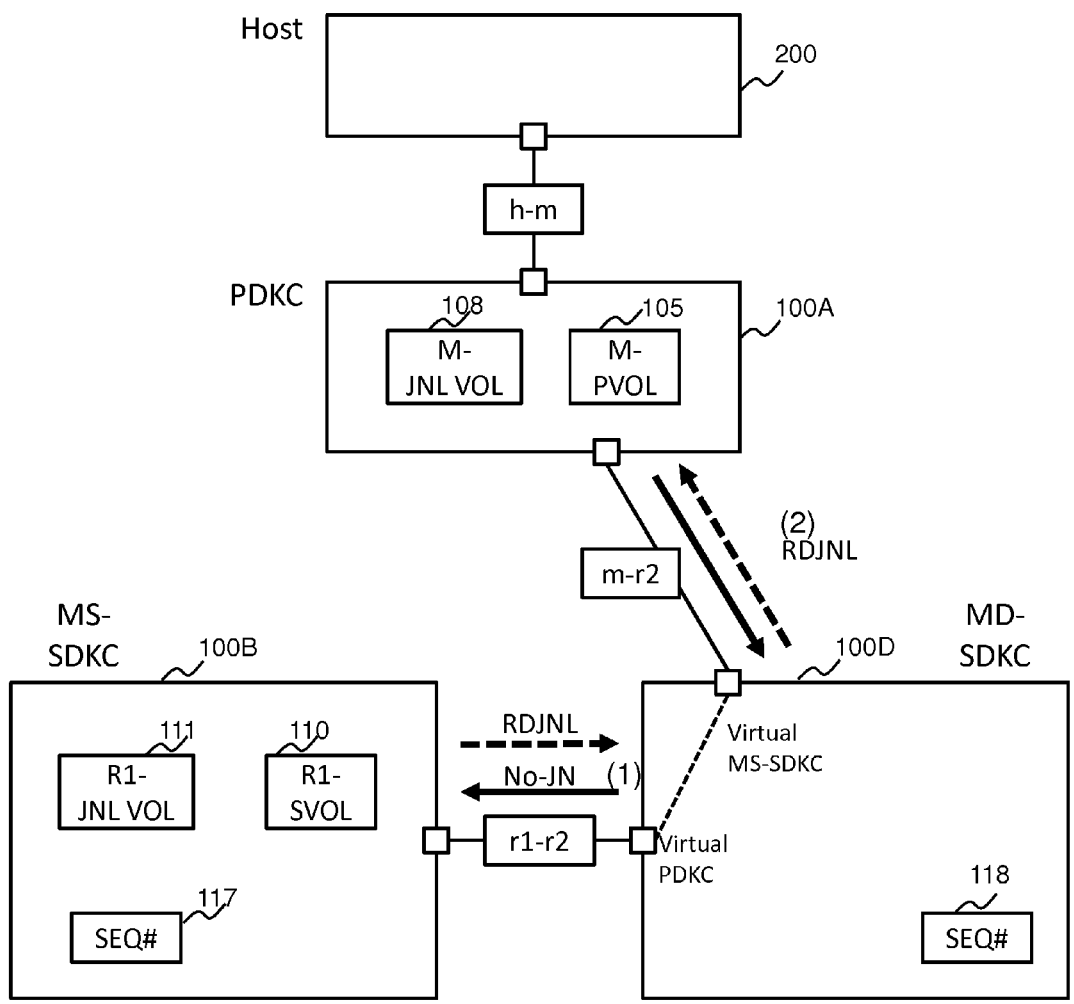
FIG. 26 is a drawing illustrating the RDJNL command processing prior to starting a data migration.

FIG. 25 is a flowchart of RDJNL command processing (second time and beyond) prior to the start of a data migration. FIG. 26 is a drawing illustrating the RDJNL command processing prior to the start of a data migration.

The MD-SDKC 100D, upon receiving a RDJNL command from the MS-SDKC 100B for the JVOL 108 in the PDKC 100A, determines whether or not the specified sequence number corresponding to the received RDJNL command is larger than a value obtained by adding the maximum number of RDJNL commands issued in parallel to the saved specified sequence number (Step S111).

In a case where the result is that the specified sequence number corresponding to the received RDJNL command is larger than the value obtained by adding the maximum number of RDJNL commands issued in parallel to the saved specified sequence number (Step S111: Y), the MD-SDKC 100D, posing as the PDKC 100A, sends no-journal as the RDJNL command execution result to the MS-SDKC 100B (Step S112, FIG. 26 (1)), and ends the processing.

Alternatively, in a case where the result is that the specified sequence number corresponding to the received RDJNL command is not larger than the value obtained by adding the maximum number of RDJNL commands issued in parallel to the saved specified sequence number (Step S111: N), the MD-SDKC 100D, posing as the MS-SDKC 100B, sends the RDJNL command and the specified sequence number to the JVOL 108 in the primary storage 100A (Step S113, FIG. 26 (2)).

The PDKC 100A, upon receiving the RDJNL command, reads the journal corresponding to the specified sequence number from the JVOL 108 (Step S114), and sends the RDJNL command execution result and the journal to the source of the RDJNL command (Step S115). The PDKC 100A perceives the source of the RDJNL command as being the MS-SDKC 100B here, and as such, is under the perception that the RDJNL command execution result is being sent to the MS-SDKC 100B, but actually the RDJNL command execution result and the journal are sent to the MD-SDKC 100D that is posing as the MS-SDKC 100B.

Next, the MD-SDKC 100D, upon receiving the RDJNL command execution result and journal from the PDKC 100A, poses as the PDKC 100A and sends the RDJNL command execution result and journal to the MS-SDKC 100B (Step S116). This makes it possible for the MS-SDKC 100B to appropriately acquire the journal corresponding to a specified sequence number that is equal to or less than the value obtained by adding the maximum number of RDJNL commands issued in parallel to the saved specified sequence number.

Next, journal formalization processing, formalized sequence number monitoring processing, and migration-destination journal acquisition processing will be explained.

Figure 27:
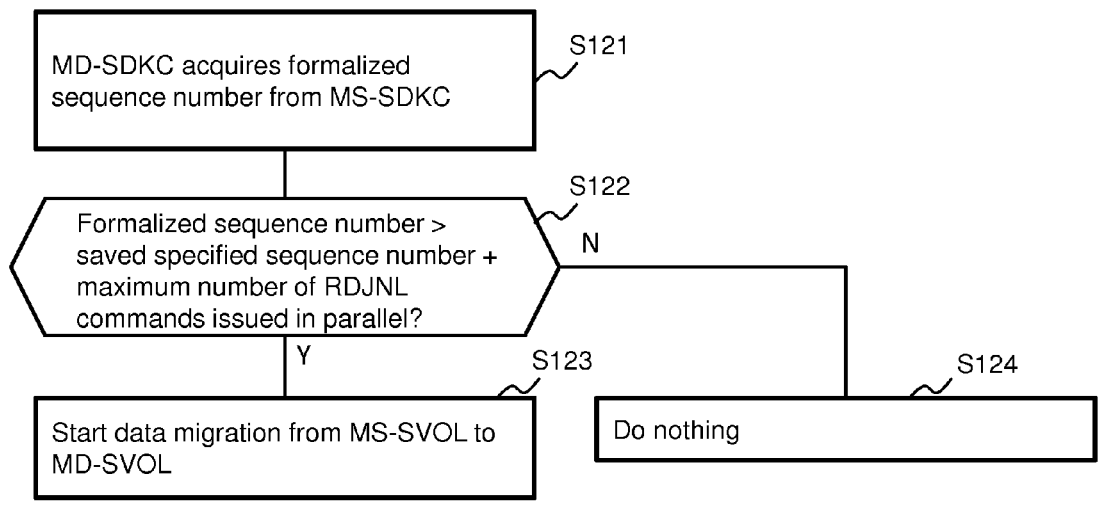
FIG. 27 is a flowchart of processing for monitoring formalized sequence numbers.
Figure 28:
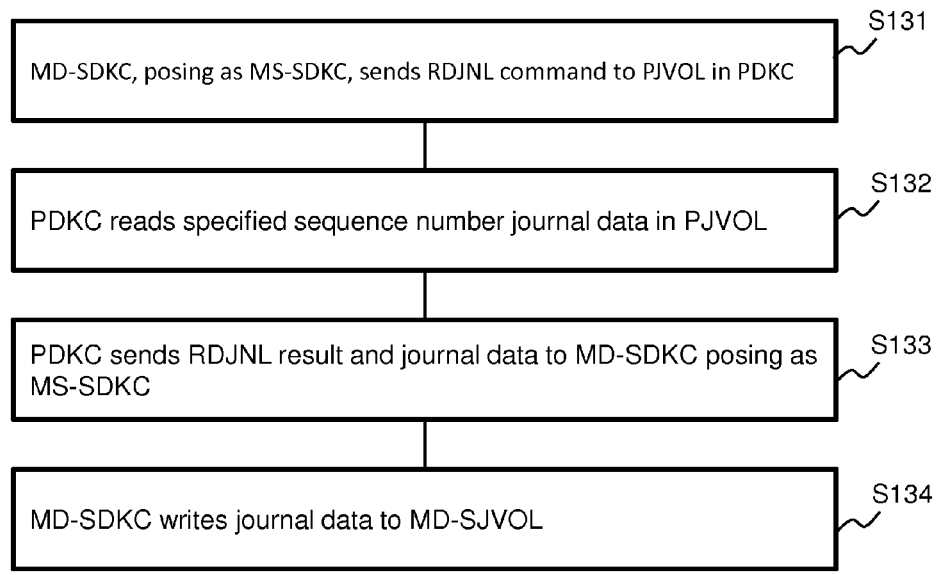
FIG. 28 is a flowchart of RDJNL command processing during a data migration.
Figure 29:
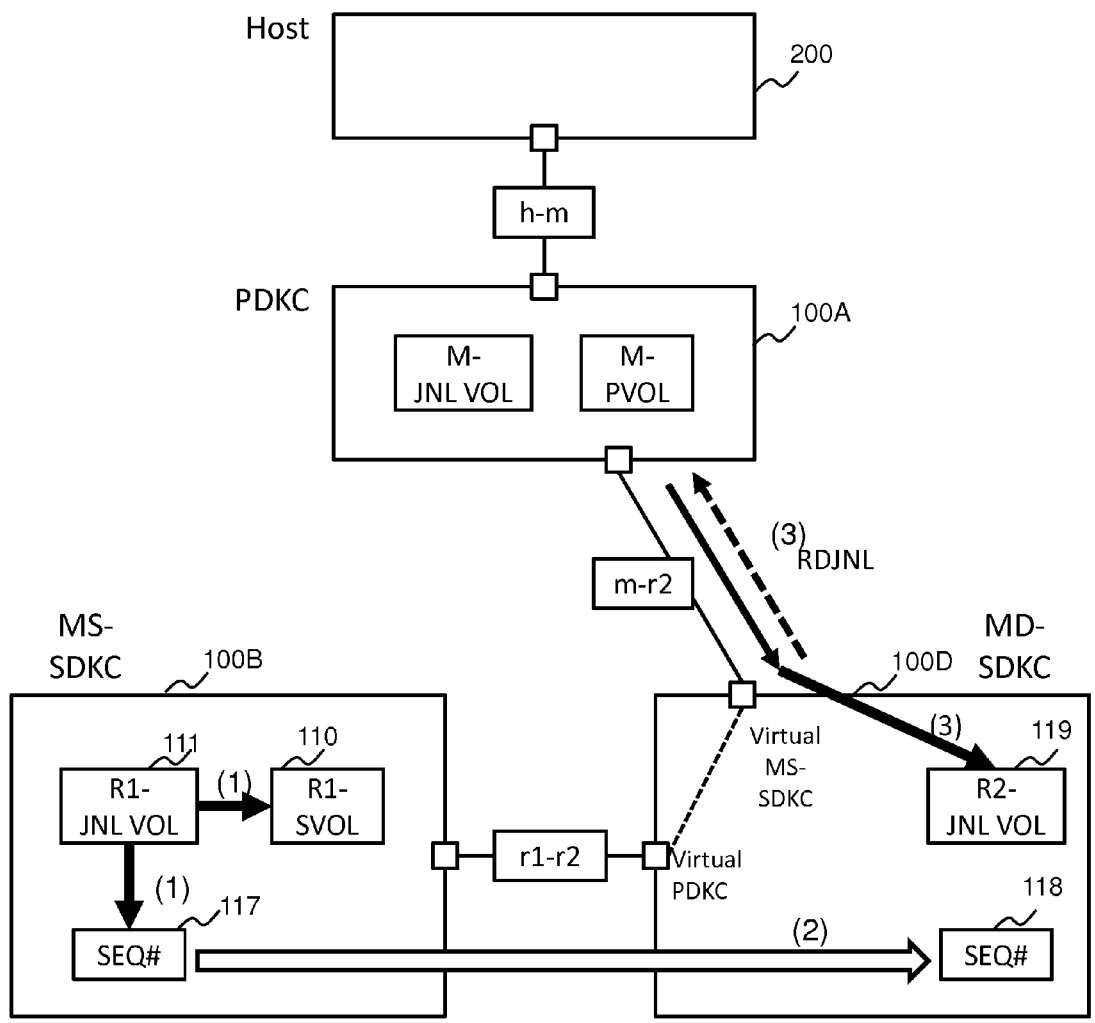
FIG. 29 is a drawing illustrating the processing for monitoring formalized sequence numbers and the RDJNL command processing during a data migration.

FIG. 27 is a flowchart of formalized sequence number monitoring processing. FIG. 28 is a flowchart of migration-destination journal acquisition processing. FIG. 29 is a drawing illustrating journal formalization processing, formalized sequence number monitoring processing, and migration-destination journal acquisition processing.

The journal formalization processing is for reflecting a journal in the SJVOL 111 in the migration-source SVOL 110. The MS-SDKC 100B refers to formalized sequence information 117, identifies the sequence number of the journal to be formalized next, acquires the journal corresponding to the sequence number from the SJVOL 111, and on the basis of the journal, writes (updates) the journal data to the SVOL 110, and updates the formalized sequence number in the formalized sequence information 117 (FIG. 29 (1)). In accordance with this, update content related to the PVOL 105 is reflected in the SVOL 111 on the basis of the journal.

The formalized sequence number monitoring process is for the MD-SDKC 100D to monitor the progress of journal formalization in the MS-SDKC 100B. This formalized sequence number monitoring processing, for example, is executed at fixed intervals.

The MD-SDKC 100D acquires a formalized sequence number from the MS-SDKC 100B (Step S121, FIG. 29 (1)), and determines whether or not the formalized sequence number is larger than a value obtained by adding the maximum number of RDJNL commands issued in parallel to the saved sequence number (Step S122).

In a case where the formalized sequence number is larger than the value obtained by adding the maximum number of RDJNL commands issued in parallel to the saved sequence number (Step S122:Y), the MD-SDKC 100D starts an SVOL migration process (refer to FIG. 30) for migrating data in the MS-SVOL 110 (Step S123), whereas in a case where the formalized sequence number is not larger than a value obtained by adding the maximum number of RDJNL commands issued in parallel to the saved sequence number (Step S122: N), ends the processing without doing anything (Step S124).

The migration-destination journal acquisition processing is for the MD-SDKC 100D to acquire a journal from the PDKC 100A, and is executed consecutively in order to acquire a journal having a sequence number after the sequence number having the value obtained by adding the maximum number of RDJNL commands issued in parallel to the saved sequence number.

The MD-SDKC 100D, posing as the MS-SDKC 100B, sends the RDJNL command and the specified sequence number to the JVOL 108 in the primary storage 100A (Step S131). Furthermore, the specified sequence number is a sequence number after the sequence number having the value obtained by adding the maximum number of RDJNL commands issued in parallel to the saved sequence number.

The PDKC 100A, upon receiving the RDJNL command, reads the journal corresponding to the specified sequence number from the JVOL 108 (Step S132), and sends the RDJNL command execution result and the journal to the source of the RDJNL command (Step S133). The MD-SDKC 100D, upon receiving the RDJNL command execution result and the journal from the PDKC 100A, stores the journal in a JVOL 119 (Step S134, FIG. 29 (3)). This makes it possible for the MD-SDKC 100D to appropriately store in the JVOL 119 the journal corresponding to the sequence number after the value obtained by adding the maximum number of RDJNL commands issued in parallel to the saved sequence number.

Next, SVOL migration processing and journal data formalization processing during a data migration will be explained.

Figure 30:
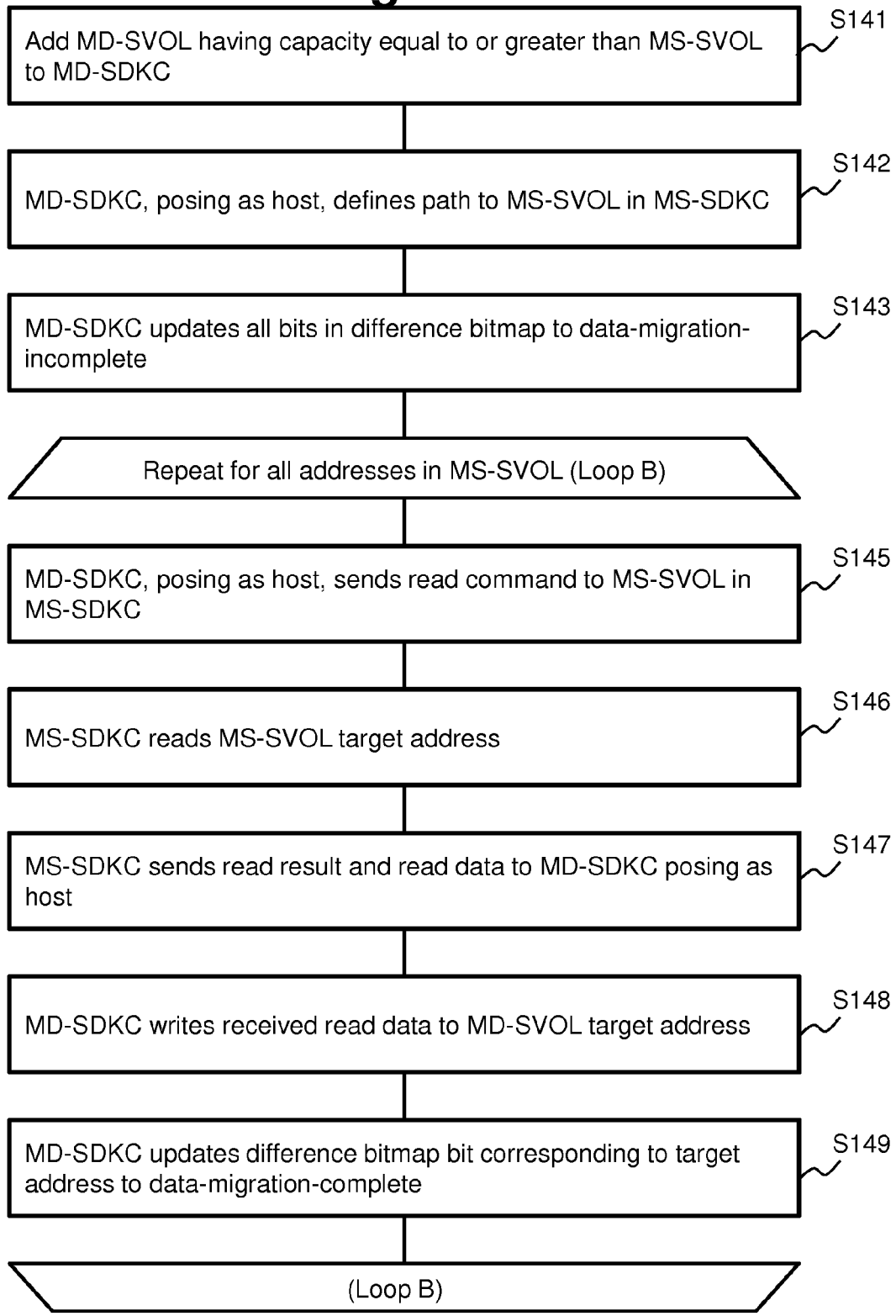
FIG. 30 is a flowchart of SVOL migration processing.
Figure 31:
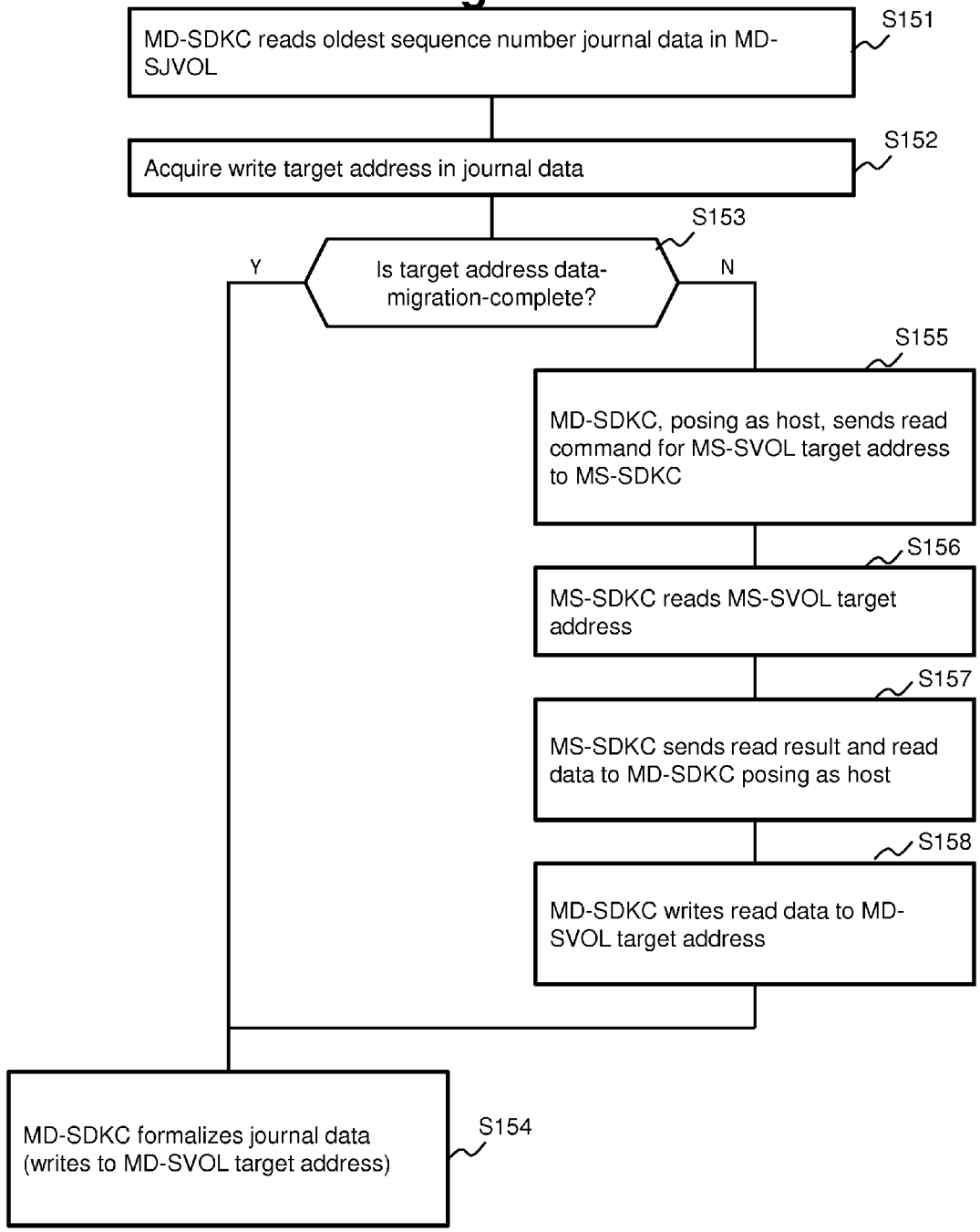
FIG. 31 is a flowchart of journal formalization processing during a data migration.
Figure 32:
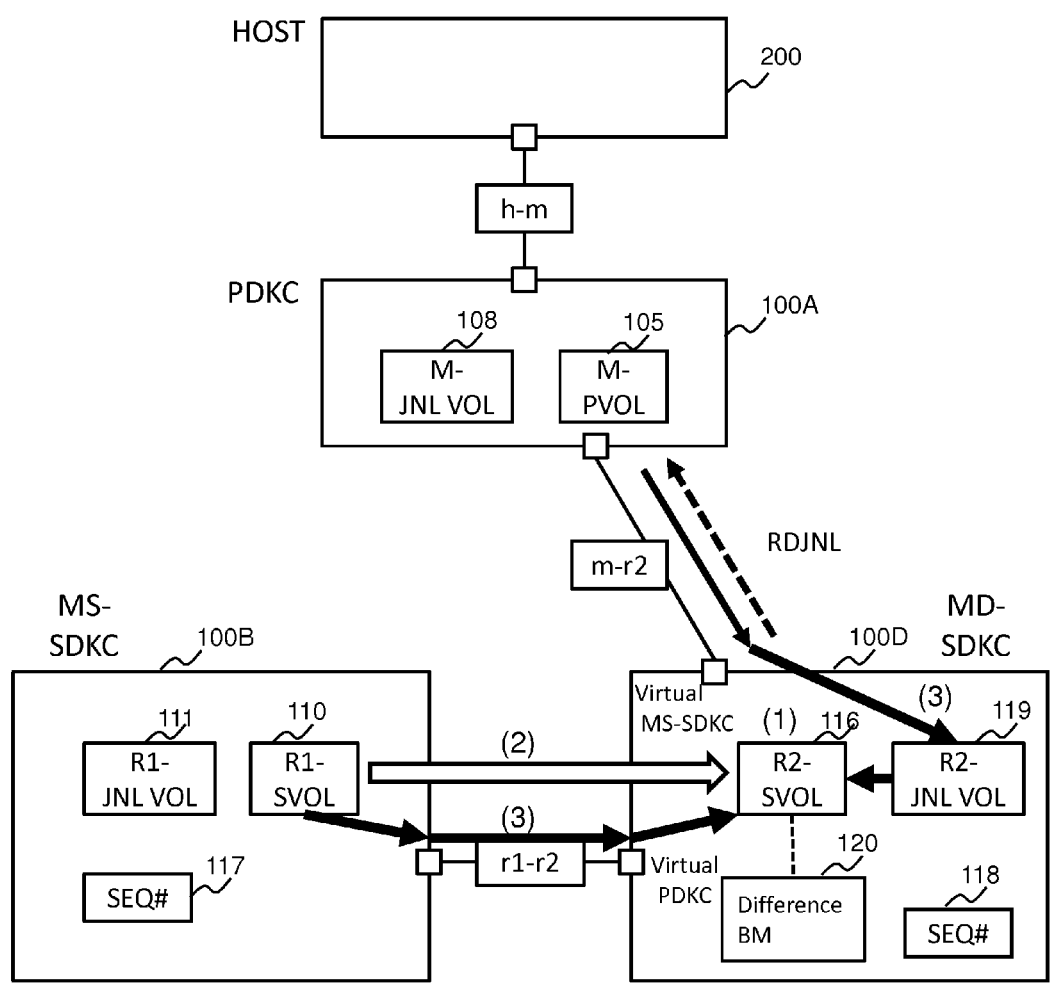
FIG. 32 is a drawing illustrating the SVOL migration processing and the journal formalization processing during a data migration.

FIG. 30 is a flowchart of SVOL migration processing. FIG. 31 is a flowchart of journal data formalization processing during a data migration. FIG. 32 is a drawing illustrating the SVOL migration processing and the journal formalization processing during a data migration.

In the SVOL migration process, first of all, the MD-SDKC 100D adds to itself a VOL (a migration-destination SVOL 116) having a capacity of equal to or larger than the SVOL 110 that is the migration destination of the MS-SVOL 110 (Step S141, FIG. 32 (1)). The MD-SDKC 100D manages a difference bitmap 120 here for managing the migration state of the SVOL 110 data in the migration-destination SVOL 116. The difference bitmap 120 includes bits corresponding to a plurality of areas (blocks) in the migration-destination SVOL 116, and in accordance with the values of these bits, shows whether or not the SVOL 110 data is being migrated (copied) to these areas.

Next, the MD-SDKC 100D, posing as the host 200, defines a path to the SVOL 110 in the MS-SDKC 100D (Step S142).

Next, the MD-SDKC 100D updates the values of all the bits in the difference bitmap 120 to values showing that the data migration has not been completed (Step S143).

Then, the MD-SDKC 100D assumes control and executes the processing of loop (B) (Step S145 through Step S149) targeted at the addresses of the areas for which the MS-SVOL 110 data migration has yet to be completed, thereby executing the data migration from the MS-SVOL 110 to the migration-destination SVOL 116 (FIG. 32 (2)). In the explanation of the processing in loop (B), an address targeted for processing will be referred to as a target address.

Specifically, the MD-SDKC 100D, posing as the host 200, sends a read command for reading the target address in the MS-SVOL 110 in the MD-SDKC 100B (Step S145). Upon receiving this read command, the MS-SDKC 100B reads the data of the SVOL 110 target-address in accordance with the read command (Step S146), and sends the read result and the data that was read (read data) to the source of the read command (Step S147). The MS-SDKC 100B perceives the read command source as being the host 200 here, and as such, perceives that the read result and the read data are being sent to the host 200, but actually the read result and the read data are sent to the MD-SDKC 100D that is posing as the host 200.

The MD-SDKC 100D writes the read data received from the MS-SDKC 100B to the target address of the migration-destination SVOL 116 (Step S148), and updates the bit of the area corresponding to the target address in the difference bitmap 120 to a value showing that data migration has been completed (Step S149).

Then, after executing the loop (B) processing targeted at all the addresses in the area of the MS-SVOL 110 for which data migration has not been completed, the MD-SDKC 100D ends the processing.

According to this processing, all the data of the SVOL 110 in the MS-SDKC 100B is migrated to the migration-destination SVOL 116 in the MD-SDKC 100D.

Next, journal data formalization processing during data migration will be explained. The journal data formalization processing during data migration, for example, is executed after the execution of the SVOL migration process has been started.

The MD-SDKC 100D reads the journal having the oldest (smallest) sequence number stored in the MD-JVOL 119 (Step S151). Next, the MD-SDKC 100D acquires the write-target address (target address) inside the journal (in the update information including the journal) (Step S152).

Next, the MD-SDKC 100D refers to the difference bitmap 120 to determine whether or not the data migration from the SVOL 110 has been completed for the target-address area in the migration-destination SVOL 116 (Step S153). In a case where the result is that the data migration is complete, the MD-SDKC 100D formalizes the processing-target journal. That is, the MD-SDKC 100D writes the journal data, which is the update content of the processing-target journal, to the target address in the migration-destination SVOL 116, and deletes the corresponding journal from the JVOL 119 (Step S154, FIG. 32 (3)).

Alternatively, in a case where the result is that the data migration is not complete, the MD-SDKC 100D poses as the host 200 and sends a read command for reading the target address of the MS-SVOL 110 in the MS-SDKC 100B (Step S155). Upon receiving this read command, the MS-SDKC 100B reads the target-address data of the SVOL 110 in accordance with the read command (Step S156), and sends the read result and the read data to the source of the read command (Step S157). The MS-SDKC 100B perceives the read command source as being the host 200 here, and as such, perceives that the read result and the read data are being sent to the host 200, but actually the read result and the read data are sent to the MD-SDKC 100D that is posing as the host 200.

Next, the MD-SDKC 100D writes the read data received from the MS-SDKC 100B to the target address of the migration-destination SVOL 116 (Step S158), updates the difference bitmap 120 bit of the area corresponding to the target address to a value showing that data migration has been completed, and the MD-SDKC 100D formalizes the processing-target journal data (Step S154: FIG. 32 (3)).

Next, processing after the completion of a data migration, which is executed after the SVOL 110 data migration has been completed, will be explained.

Figure 33:
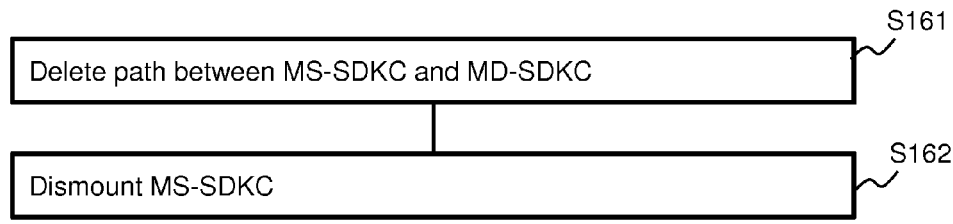
FIG. 33 is a flowchart of processing after the completion of a data migration.
Figure 34:
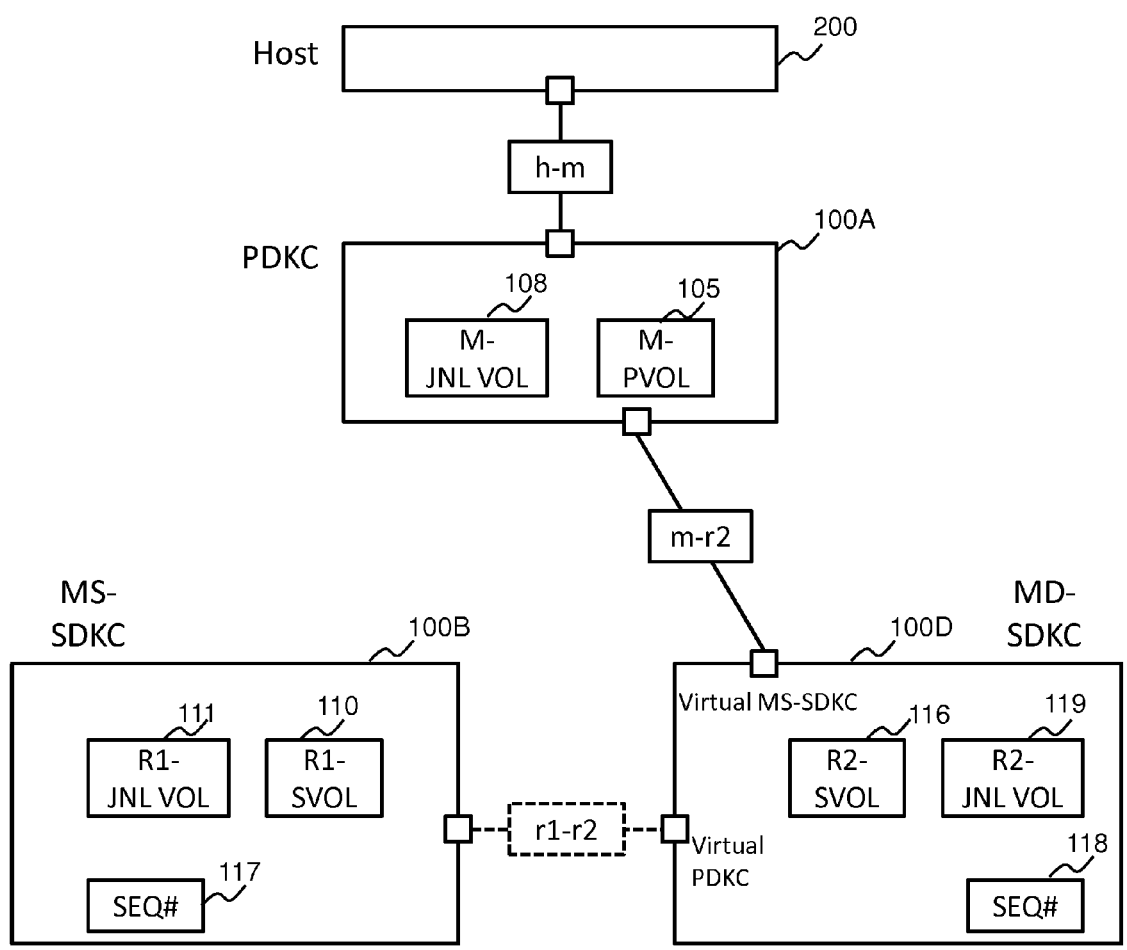
FIG. 34 is a drawing illustrating the deletion of a path after the completion of a data migration.

FIG. 33 is a flowchart of processing after the completion of a data migration. FIG. 34 is a drawing illustration the deletion of a path after a data migration has been completed.

After the SVOL 110 data migration has been completed, the MD-SDKC 100D deletes the path (path r1-r2) between the MS-SDKC 100B and the MD-SDKC 100D (Step S161: refer to FIG. 34). Thereafter, the administrator can dismount the MS-SDKC 100B from the computer system (Step S162).

Next, the computer system shown in FIG. 34 after having the MS-SDKC 100D dismounted will be explained.

Figure 35:
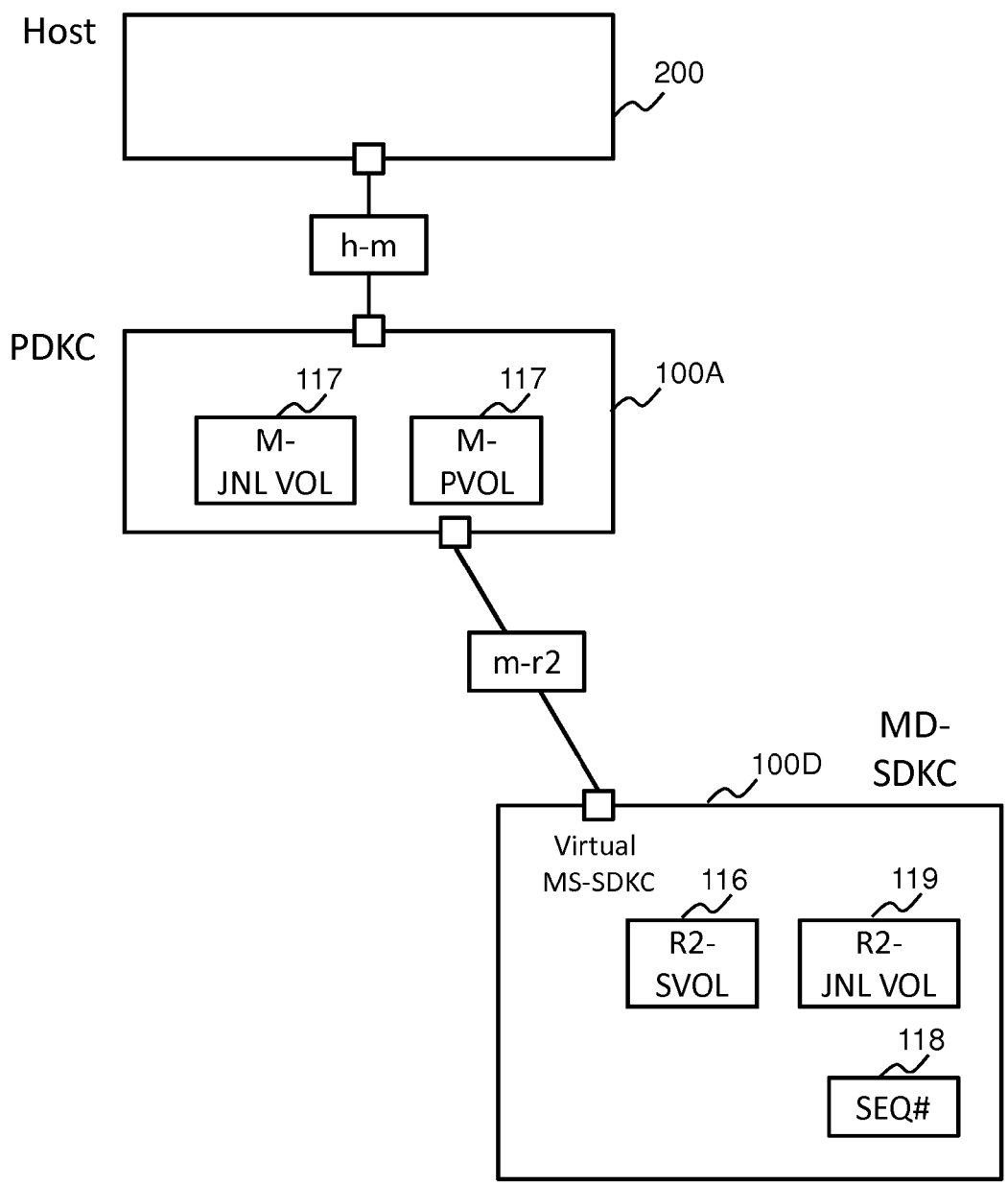
FIG. 35 is a drawing illustrating the dismounting of a MS-SDKC.

FIG. 35 is a drawing illustrating the dismounting of a MS-SDKC.

As shown in FIG. 35, the MD-SDKC 100D poses as the MS-SDKC 100B with respect to the PDKC 100A in communications via the path m-r2. Therefore, the PDKC 100A is able to communication with the MD-SDKC 100D without being the least bit aware of the fact that communications are being carried out with the migration-destination source SDKC 100B the same as before.

A number of examples have been explained hereinabove, but it goes without saying that the present invention is not limited to these examples, and that various changes are possible without departing from the gist thereof.

For example, Example 1 is an example for migrating a PVOL, and Example 2 is an example for migrating an SVOL, but, for example, it is possible to combine Example 1 and Example 2 to migrate the PVOL and the SVOL in parallel.

REFERENCE SIGNS LIST

100A MS-PDKC
100B MS-SDKC
100C MD-PDKC
100D MD-SDKC
101 Port
102 MPPK
105 PVOL
110 SVOL
200 Host

The invention claimed is:

1. A migration-destination primary storage apparatus coupled to a migration-source primary storage apparatus, the migration-source primary storage apparatus having a migration-source primary logical volume forming a copy pair with a secondary logical volume in a secondary storage apparatus, a first journal storage area storing a journal corresponding to write-data for the migration-source primary logical volume, and a first control device transferring the journal to the secondary storage apparatus, the migration-destination primary storage apparatus comprising:
a migration-destination primary logical volume;
a second journal storage area storing a journal corresponding to write-data for the migration-destination primary logical volume;
a second control device; and
multiple communication ports,
wherein the second control device is configured to:
form a first path to the secondary storage apparatus by virtualizing a first communication port, which, of the multiple communication ports, is coupled to the secondary storage apparatus, to first port identification information, which is the identification information of a communication port of the migration-source primary storage apparatus,
form a second path to the migration-source primary storage apparatus by virtualizing a second communication port, which, of the multiple communication ports, is coupled to the migration-source primary storage apparatus, to second port identification information, which is the identification information of a host communication port coupled to any of the multiple communication ports,
form a third path to the migration-source primary storage apparatus by virtualizing a third communication port, which, of the multiple communication ports, is coupled to the migration-source primary storage apparatus, to third port identification information, which is the identification information of a communication port of the secondary storage apparatus,
form a fourth path to the host by virtualizing a fourth communication port, which, of the multiple communication ports, is coupled to the host, to the first communication port identification information, which is the identification information of a communication port of the migration-source primary storage apparatus, in a case where a read request for the migration-source primary storage apparatus has been received, execute a data copy, of the data corresponding to the read request, from the migration-source primary logical volume to the migration-destination primary logical volume by sending the read request to the migration-source primary storage apparatus via the second path, in a case where a read request for the migration-destination primary logical volume has been received from the host before a copying process has been completed, read read-data from the migration-destination primary logical volume and send the read read-data to the host via the fourth path if the read-data conforming to the read request is data that has been copied from the migration-source primary logical volume to the migration-destination primary logical volume, and read the read-data from the migration-source primary logical volume via the second path and send the read read-data to the host via the fourth path if the read-data is data that has not been completely copied to the migration-destination primary logical volume, acquire, after the copying process has been completed, a latest sequence information, which is latest write sequence information, from the migration-source primary storage apparatus via the second path, and thereafter, in a case where a write request for the migration-destination primary logical volume has been received, write write-data conforming to the write-request to the migration-destination primary logical volume, create a journal by using journal data corresponding to the write-data and also by using update information showing write sequence information based on the acquired latest sequence information, and write this journal to the second journal storage area, and in a case where a journal read request has been received from the secondary storage apparatus, if a sequence denoted by identified sequence information, which is sequence information identified from the received journal read request, is before a sequence denoted by the latest sequence information, acquire a corresponding journal from the first journal storage area by transferring the journal read request to the migration-source primary storage apparatus via the third path, and if a sequence denoted by the identified sequence information comes after a sequence denoted by the latest sequence information, acquire a corresponding journal from the second journal storage area, send the acquired journal to the secondary storage apparatus via the first path, and delete the third path if, prior to acquiring the corresponding journal from the first journal storage area or acquiring the corresponding journal from the second journal storage area, it is determined that the journal corresponding to the journal read request is not to be acquired from the first journal storage area.

2. The migration-destination primary storage apparatus according to claim 1, further comprising a cache memory, wherein the second control device is configured to store the write-data in the cache memory, write the write-data to the migration-source primary logical volume, and thereafter, write the write-data to the migration-destination primary logical volume.

3. The migration-destination primary storage apparatus according to claim 1,
wherein the determination of whether the journal corresponding to the journal read request is not to be acquired from the first journal storage area is based on a number of parallel journal read requests allowed according to specifications of the migration-destination primary storage apparatus.

4. A method for performing a migration to a migration-destination primary storage apparatus from a migration-source primary storage apparatus, which has a migration-source primary logical volume forming a copy pair with a secondary logical volume in a secondary storage apparatus, and a first journal storage area storing a journal corresponding to write-data for the migration-source primary logical volume, and transfers the journal to the secondary storage apparatus, with the migration-destination primary storage apparatus having:
a migration-destination primary logical volume;
a second journal storage area storing a journal corresponding to write-data for the migration-destination primary logical volume; a second control device; and
multiple communication ports,
the method, which is performed by the second control device, comprising:
forming a first path to the secondary storage apparatus by virtualizing a first communication port, which, of the multiple communication ports, is coupled to the secondary storage apparatus, to first port identification information, which is the identification information of a communication port of the migration-source primary storage apparatus,
forming a second path to the migration-source primary storage apparatus by virtualizing a second communication port, which, of the multiple communication ports, is coupled to the migration-source primary storage apparatus, to second port identification information, which is the identification information of a host communication port coupled to any of the multiple communication ports,
forming a third path to the migration-source primary storage apparatus by virtualizing a third communication port, which, of the multiple communication ports, is coupled to the migration-source primary storage apparatus, to third port identification information, which is the identification information of a communication port of the secondary storage apparatus,
forming a fourth path to the host by virtualizing a fourth communication port, which, of the multiple communication ports, is coupled to the host, to first communication port identification information, which is the identification information of a communication port of the migration-source primary storage apparatus,
in a case where a read request for the migration-source primary storage apparatus has been received, executing a data copy, of the data corresponding to the read request, from the migration-source primary logical volume to the migration-destination primary logical volume by sending the read request to the migration-source primary storage apparatus via the second path,
in a case where a read request for the migration-destination primary logical volume has been received from the host before a copying process has been completed, reading read-data from the migration-destination primary logical volume and sending the read read-data to the host via the fourth path if the read-data conforming to the read request is data that has been copied from the migration-source primary logical volume to the migration-destination primary logical volume, and reading the read-data from the migration-source primary logical volume via the second path and sending the read read-data to the host via the fourth path if the read-data is data that has not been completely copied to the migration-destination primary logical volume, acquiring, after the copying process has been completed, a latest sequence information, which is latest write sequence information, from the migration-source primary storage apparatus via the second path, and thereafter, in a case where a write request for the migration-destination primary logical volume has been received, writing write-data conforming to the write-request to the migration-destination primary logical volume, creating a journal by using journal data corresponding to the write-data and also by using update information showing write sequence information based on the acquired latest sequence information, and writing this journal to the second journal storage area, and in a case where a journal read request has been received from the secondary storage apparatus, if a sequence denoted by identified sequence information, which is sequence information identified from the received journal read request, is before a sequence denoted by the latest sequence information, acquiring a corresponding journal from the first journal storage area by transferring the journal read request to the migration-source primary storage apparatus via the third path, and if a sequence denoted by the identified sequence information comes after a sequence denoted by the latest sequence information, acquiring a corresponding journal from the second journal storage area, sending the acquired journal to the secondary storage apparatus via the first path, and deleting the third path if prior to acquiring the corresponding journal from the first journal storage area or acquiring the corresponding journal from the second journal storage area, it is determined that the journal corresponding to the journal read request is not to be acquired from the first journal storage area.

\* \* \* \* \*